(12) United States Patent
Hiroshima et al.

(10) Patent No.: US 10,353,158 B2
(45) Date of Patent: Jul. 16, 2019

(54) LIGHT EMITTING ELEMENT BONDED BOARD AND METHOD OF MANUFACTURING LIGHT EMITTING ELEMENT BONDED BOARD

(71) Applicant: FUJITSU LIMITED, Kawasaki-shi, Kanagawa (JP)

(72) Inventors: Yoshiyuki Hiroshima, Nakano (JP); Akiko Matsui, Meguro (JP); Mitsuhiko Sugane, Ichikawa (JP); Takahide Mukoyama, Kamakura (JP); Tetsuro Yamada, Kawasaki (JP); Kohei Choraku, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/813,191

(22) Filed: Nov. 15, 2017

(65) Prior Publication Data

US 2018/0156993 A1 Jun. 7, 2018

(30) Foreign Application Priority Data

Dec. 7, 2016 (JP) .................................. 2016-237456

(51) Int. Cl.
*G02B 6/12* (2006.01)
*G02B 6/42* (2006.01)

(52) U.S. Cl.
CPC ....... *G02B 6/4245* (2013.01); *G02B 6/12002* (2013.01); *G02B 6/4214* (2013.01); *G02B 6/4221* (2013.01); *G02B 6/4238* (2013.01); *G02B 6/4239* (2013.01); *G02B 6/4246* (2013.01)

(58) Field of Classification Search
None
See application file for complete search history.

(56) References Cited

U.S. PATENT DOCUMENTS

| | | | | |
|---|---|---|---|---|
| 6,690,845 | B1 * | 2/2004 | Yoshimura | G02B 6/12002 257/E23.01 |
| 7,139,448 | B2 * | 11/2006 | Jain | G02B 6/43 385/14 |
| 8,014,638 | B2 * | 9/2011 | Nakano | G02B 6/43 385/130 |
| 8,111,954 | B2 * | 2/2012 | Koizumi | G02B 6/43 385/129 |
| 2004/0190831 | A1 * | 9/2004 | Lu | G02B 6/423 385/49 |
| 2009/0103860 | A1 * | 4/2009 | Kim | G02B 6/43 385/14 |

(Continued)

FOREIGN PATENT DOCUMENTS

| | | |
|---|---|---|
| JP | 2004-163722 | 6/2004 |
| JP | 2012-186301 | 9/2012 |
| JP | 2016-136615 | 7/2016 |

*Primary Examiner* — Tina M Wong
(74) *Attorney, Agent, or Firm* — Fujitsu Patent Center

(57) ABSTRACT

A light emitting element bonded board includes an optical waveguide formed within a board, a hollowed portion in the board, a light emitting element installed in the hollowed portion, and a conductive portion formed in an upper layer and/or a lower layer of the optical waveguide, wherein an optical axis of the light emitting element coincides with a center line of the optical waveguide, and a bonding portion of the light emitting element is bonded to the conductive portion.

5 Claims, 19 Drawing Sheets

(56) References Cited

U.S. PATENT DOCUMENTS

2010/0032834 A1\* 2/2010 Vanalli .............. H01L 21/76898
  257/737
2014/0003018 A1 1/2014 Fujimori
2016/0219712 A1\* 7/2016 Ko ......................... H05K 1/183

\* cited by examiner

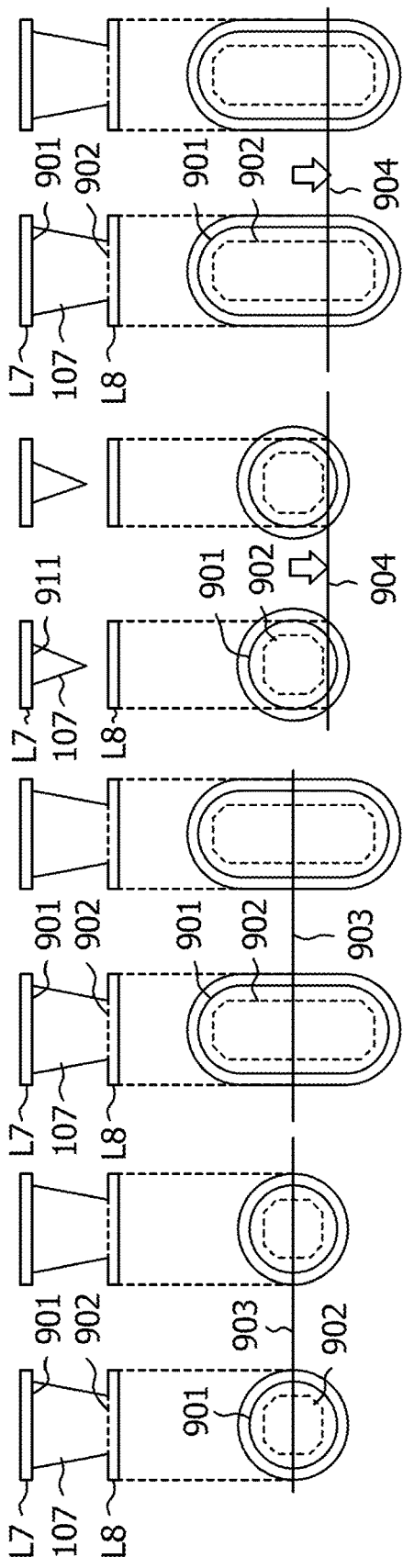

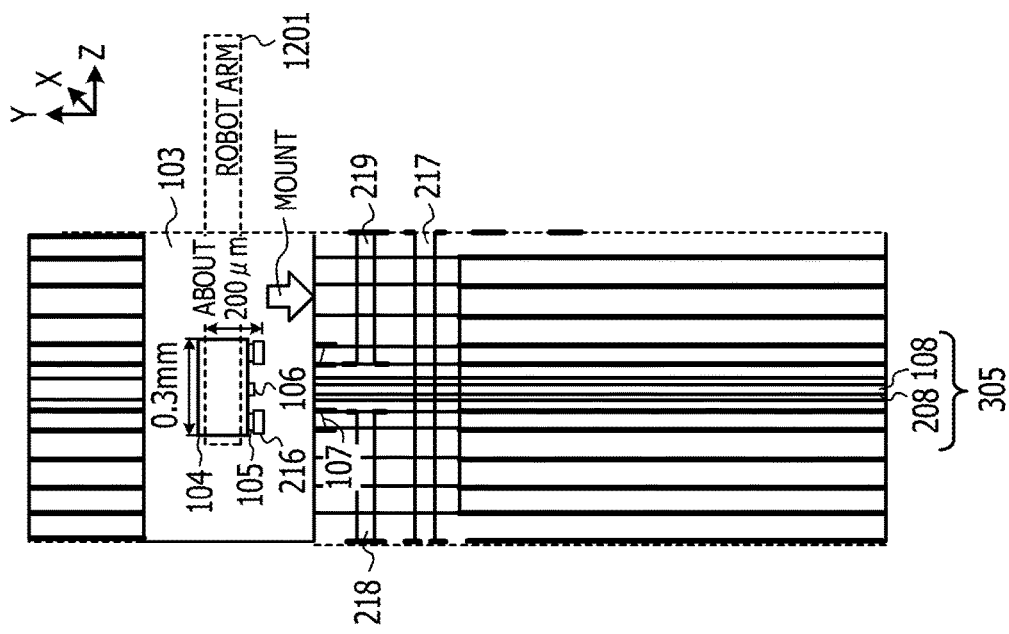
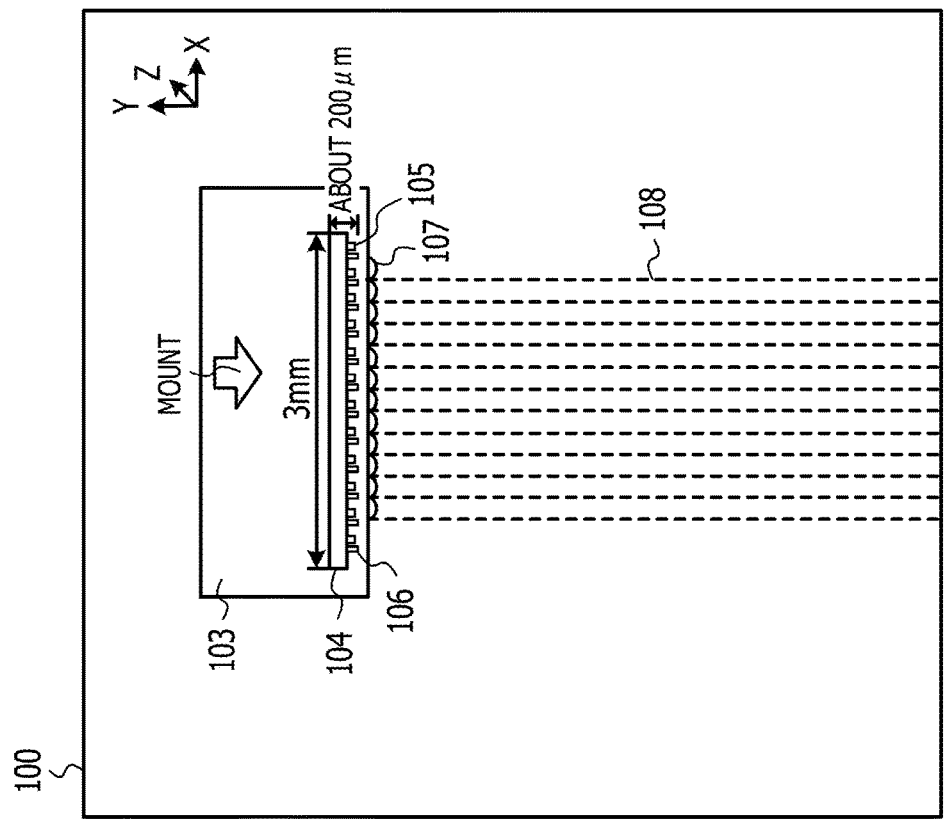

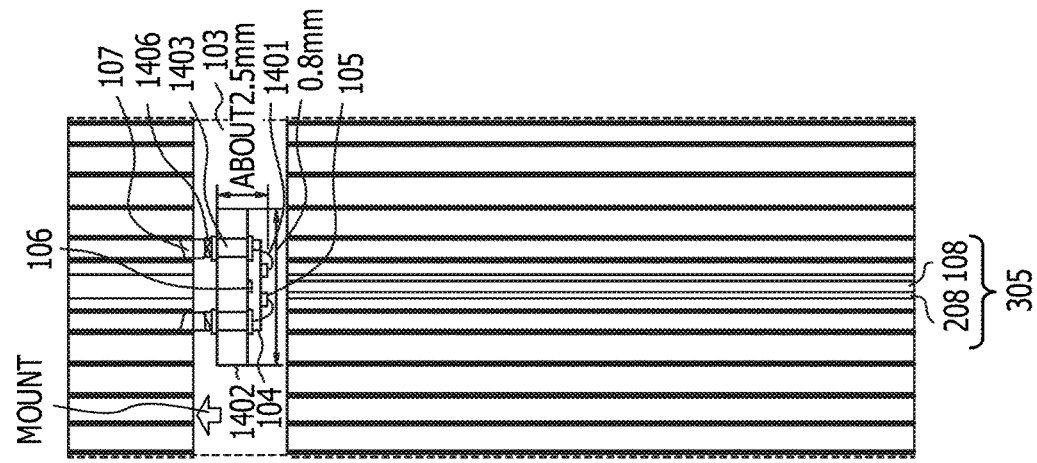
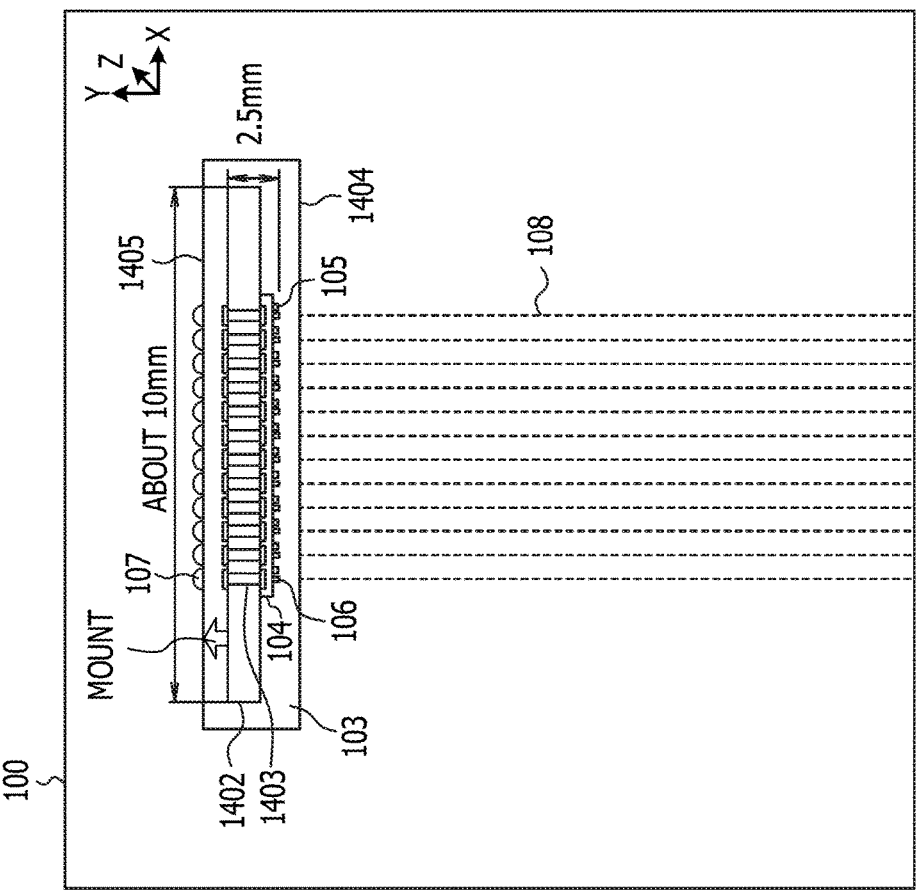

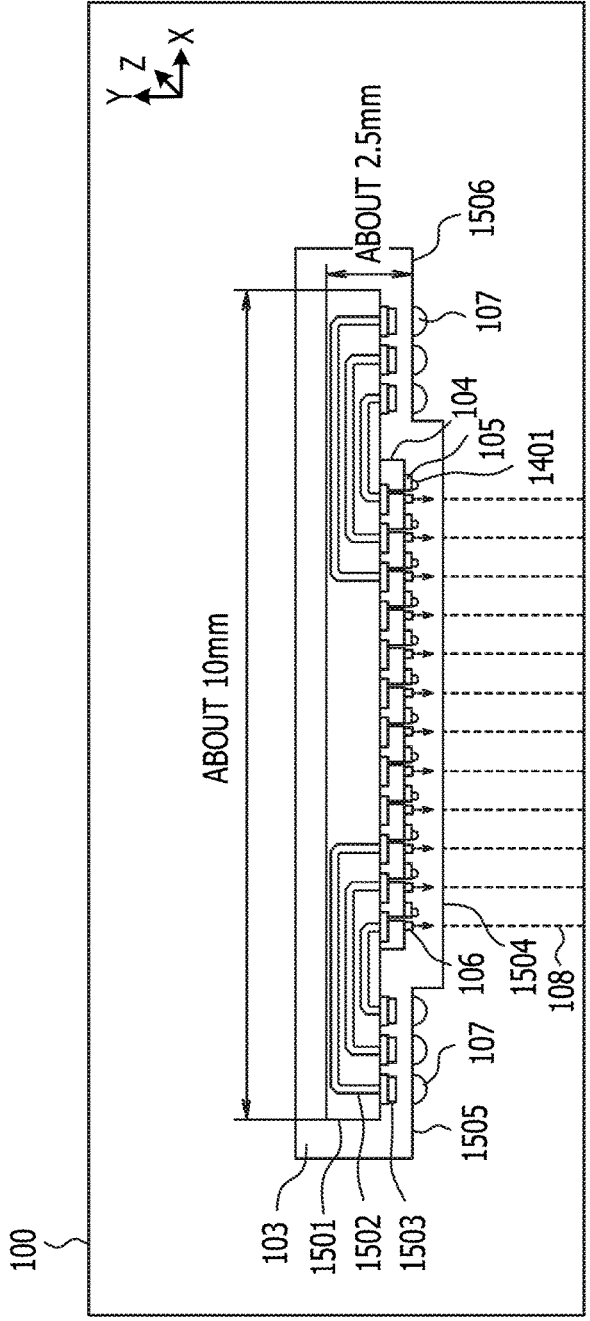
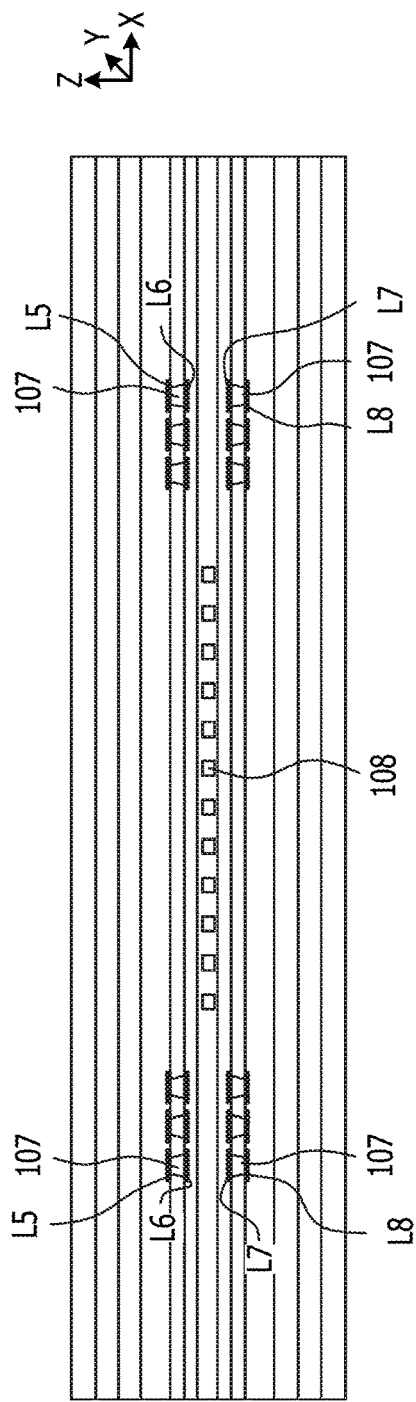

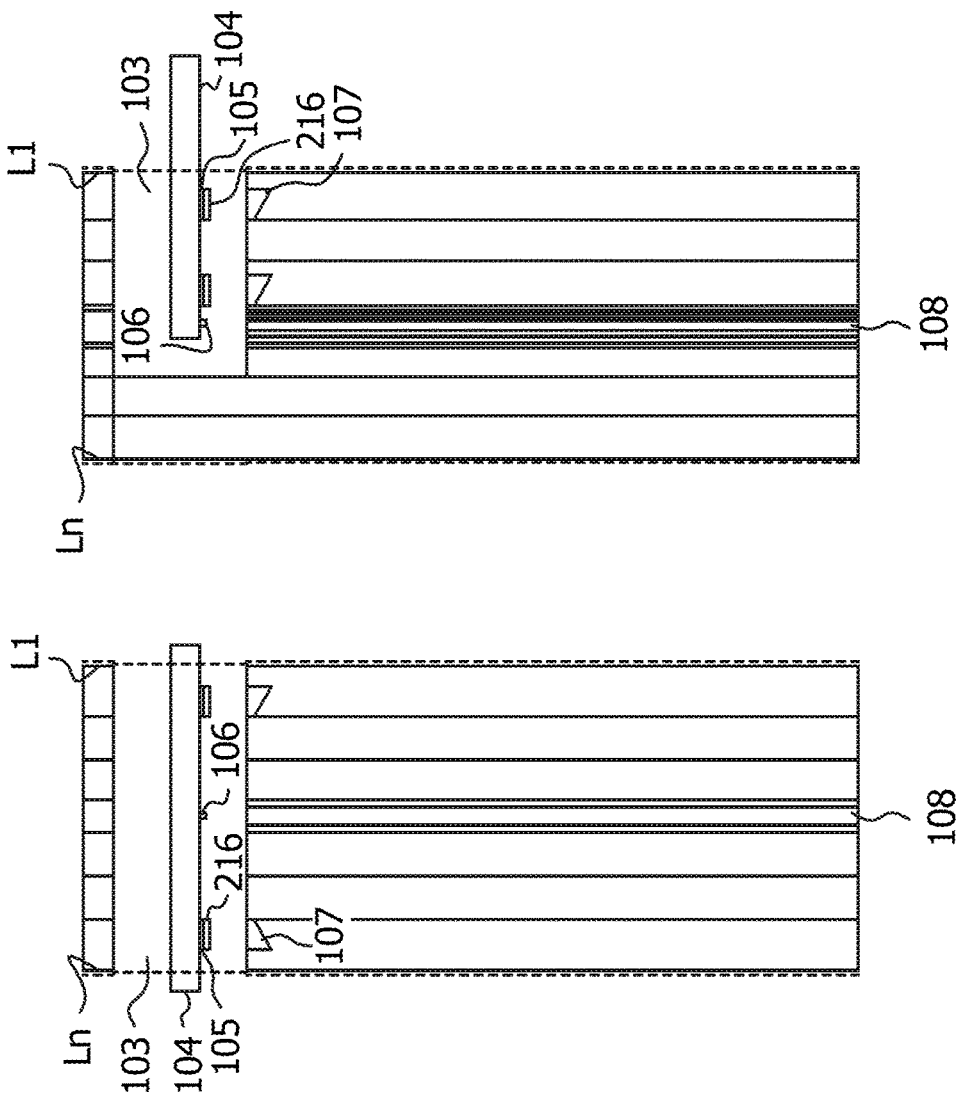

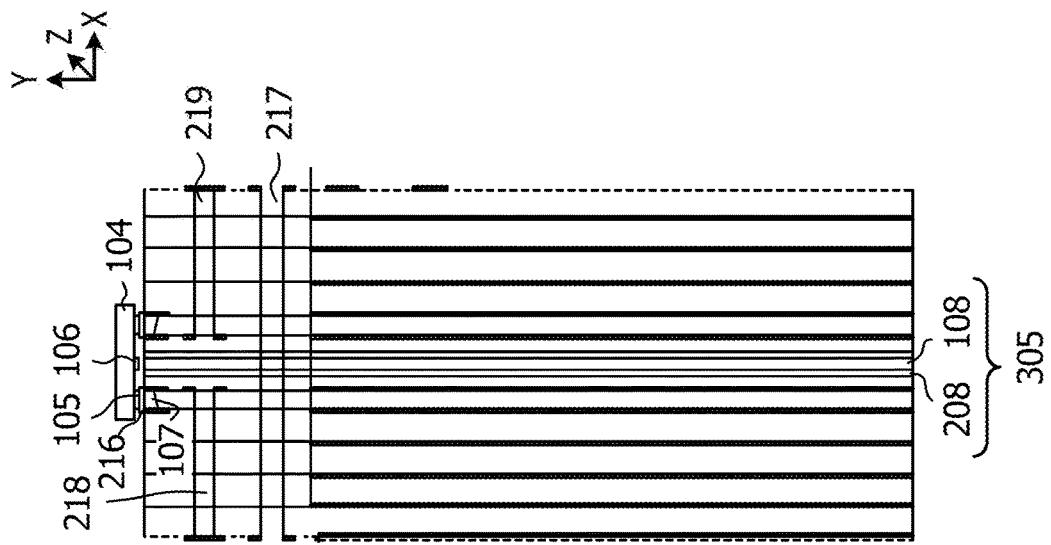
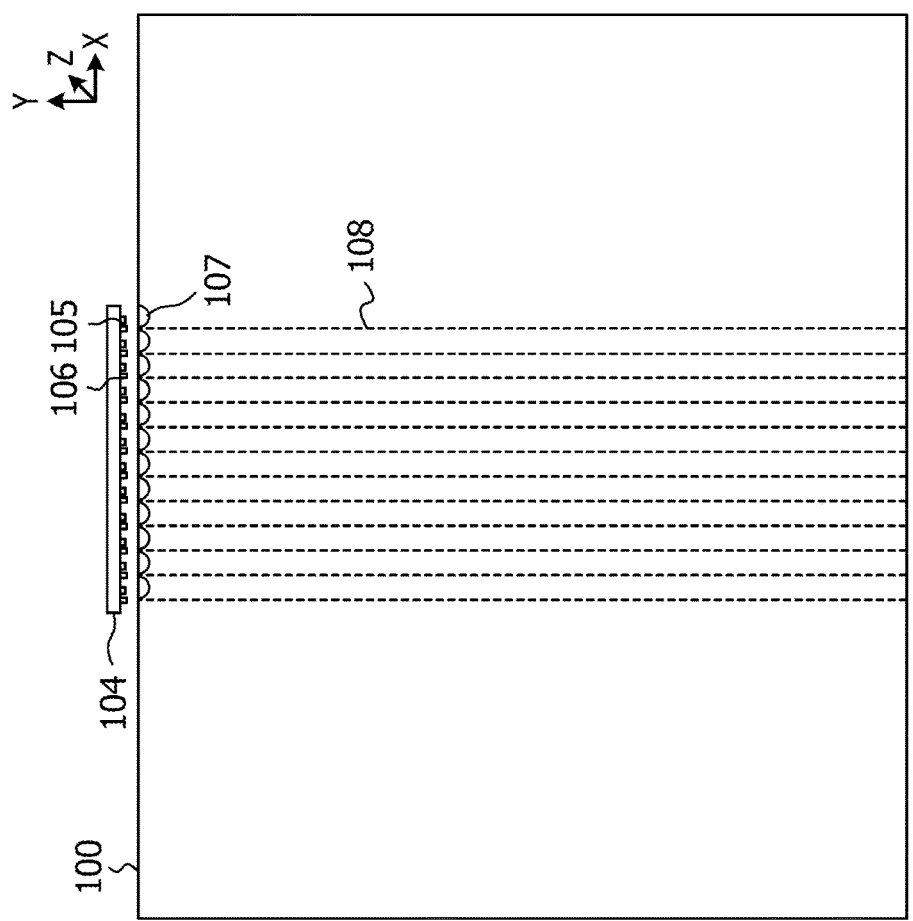

ns, as claimed.

LIGHT EMITTING ELEMENT BONDED BOARD AND METHOD OF MANUFACTURING LIGHT EMITTING ELEMENT BONDED BOARD

CROSS-REFERENCE TO RELATED APPLICATION

This application is based upon and claims the benefit of priority of the prior Japanese Patent Application No. 2016-237456, filed on Dec. 7, 2016, the entire contents of which are incorporated herein by reference.

FIELD

The embodiments discussed herein are related to a light emitting element bonded board and a method of manufacturing the light emitting element bonded board.

BACKGROUND

There has been known a wiring board including a plurality of wiring layers, a plurality of insulating layers, and an electrode member made of a conductive material. The electrode member is embedded in the wiring board while having an exposed portion on a side surface intersecting the plurality of wiring layers and the plurality of insulating layers.

There has been known an electronic component-built in board including a multilayered board in which an insulating layer and an internal circuit layer are laminated, a via formed in the insulating layer to electrically connect internal circuit layers to each other, a cavity formed in one surface of the multilayered board, a first electronic component, and a bump pad. The first electronic component is inserted into the cavity. The bump pad is formed on the surface of the cavity facing the first electronic component while the insulating layer and the via are formed to be exposed on a side wall of the cavity.

However, since a light emitting element and an optical waveguide are separate parts, it is difficult to accurately provide the light emitting element in the optical waveguide.

The followings are reference documents.
[Document 1] Japanese Laid-Open Patent Publication No. 2012-186301 and
[Document 2] Japanese Laid-Open Patent Publication No. 2016-136615.

SUMMARY

According to an aspect of the invention, a light emitting element bonded board includes an optical waveguide formed within a board, a hollowed portion in the board, a light emitting element installed in the hollowed portion, and a conductive portion formed in an upper layer and/or a lower layer of the optical waveguide, wherein an optical axis of the light emitting element coincides with a center line of the optical waveguide, and a bonding portion of the light emitting element is bonded to the conductive portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A to 9D are vertical cross-sectional views and horizontal cross-sectional views of a via;

FIGS. 12A and 12B are a surface view and a cross-sectional view illustrating the laminated board, which are explaining a process in step S605 in FIG. 6;

FIGS. 14A and 14B are a surface view and a cross-sectional view illustrating a configuration example of a light emitting element bonded board according to another embodiment;

FIGS. 15A and 15B are a surface view and a cross-sectional view illustrating a configuration example of a light emitting element bonded board according to another embodiment;

FIGS. 18A to 18C are cross-sectional views illustrating three types of configuration examples of the light emitting element bonded board; and FIGS. 19A and 19B are a surface view and a cross-sectional view illustrating a configuration example of a light emitting element bonded board according to another embodiment.

DESCRIPTION OF EMBODIMENTS

Figure 1:
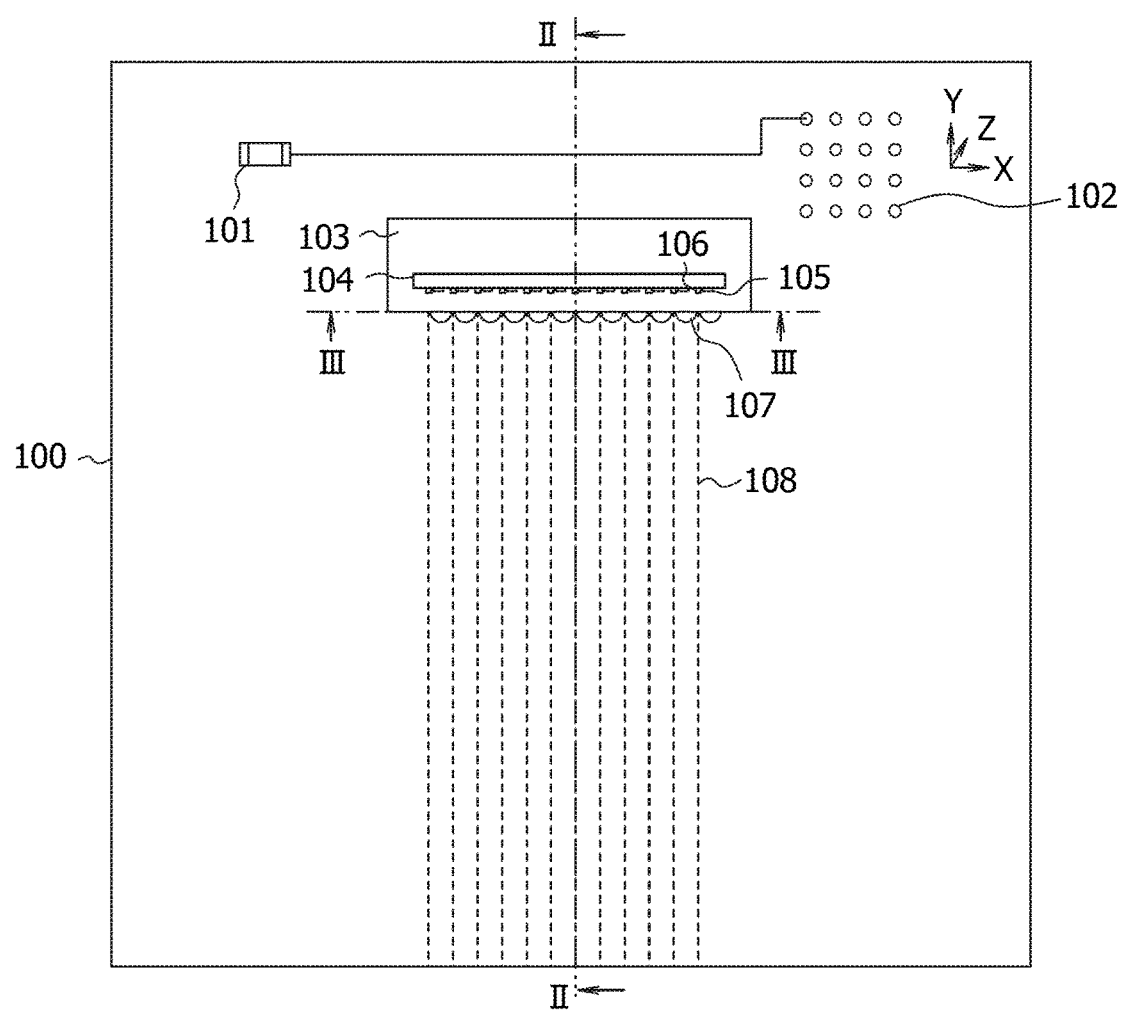
FIG. 1 is a surface view illustrating a configuration example of a light emitting element bonded board according to an embodiment.
Figure 2:
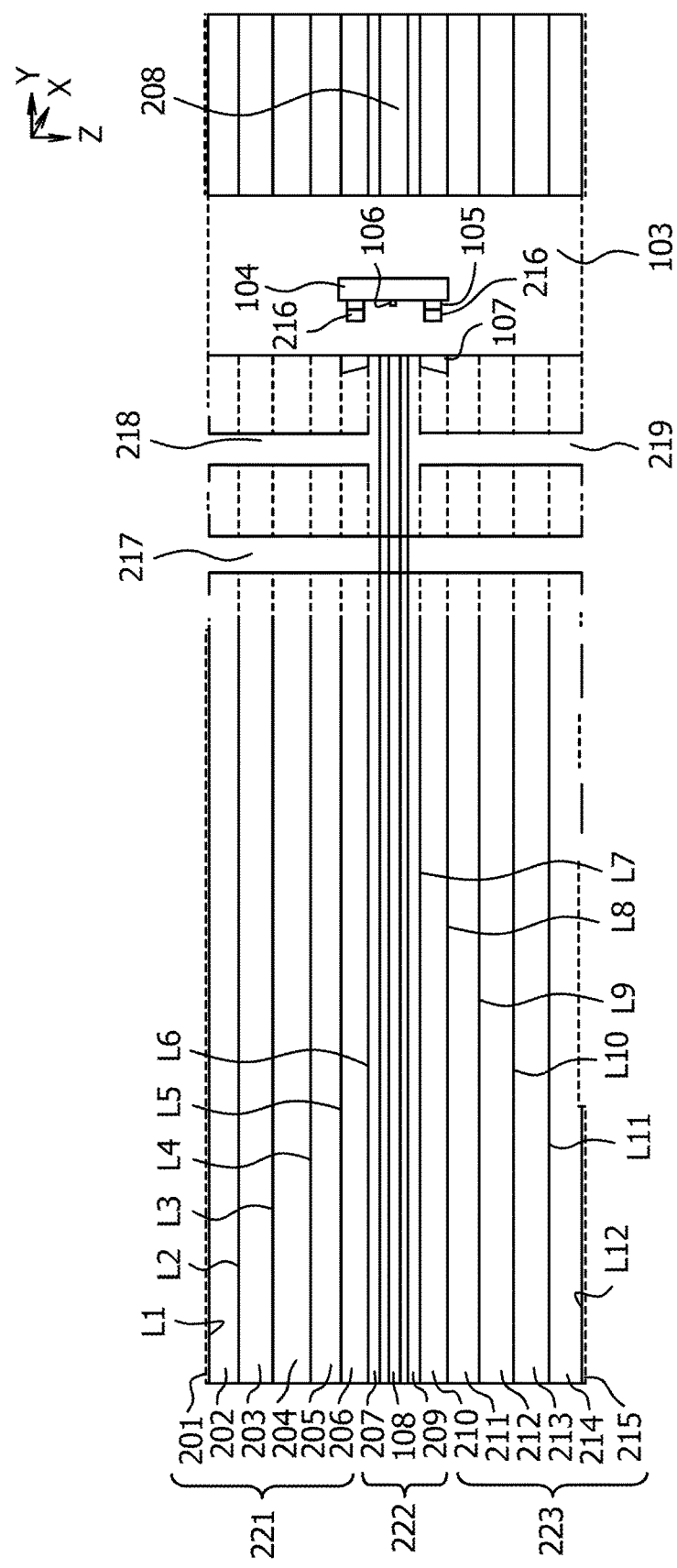
FIG. 2 is a cross-sectional view taken along line II-II in FIG. 1.
Figure 3:
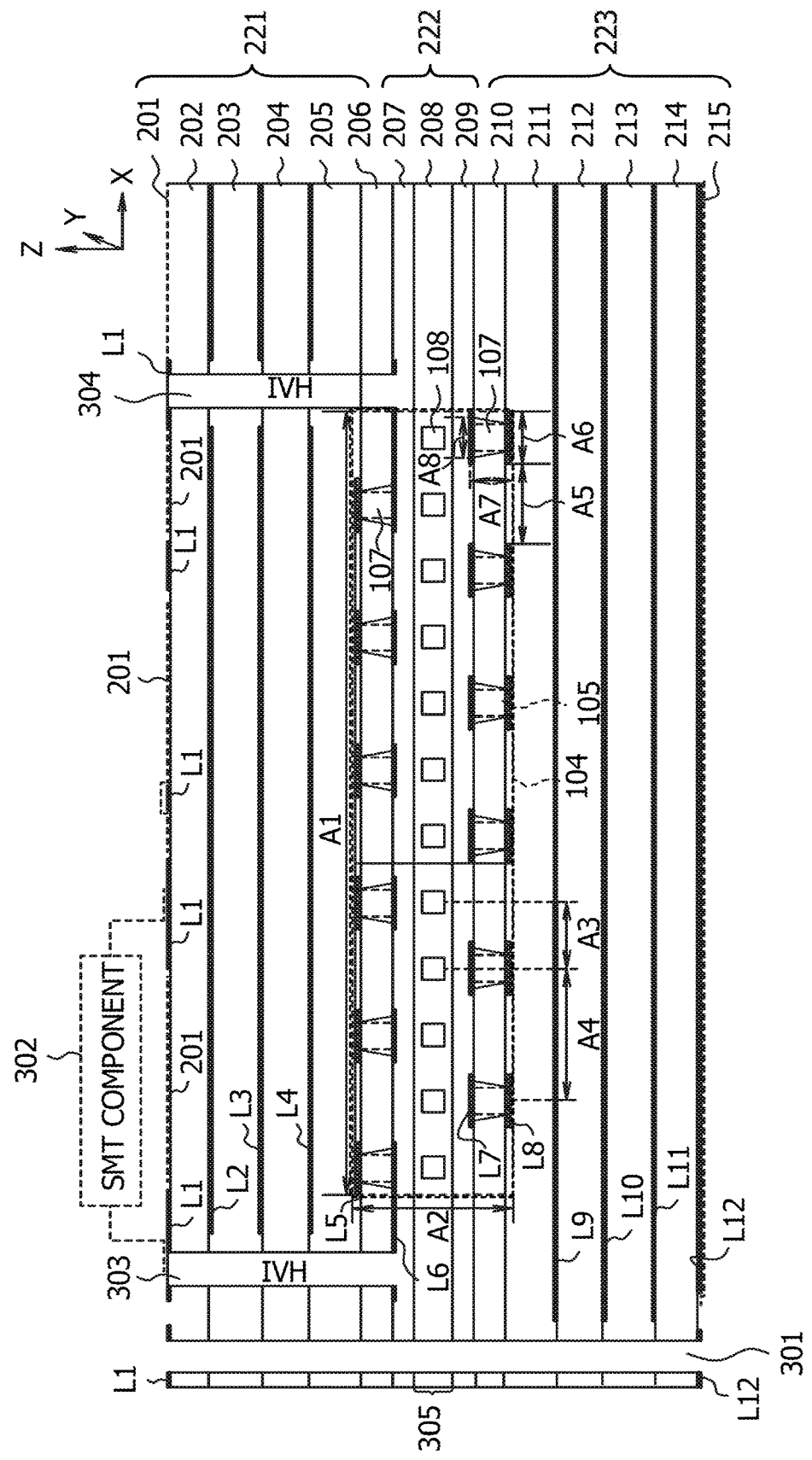
FIG. 3 is a cross-sectional view taken along line III-III in FIG. 1.

FIG. 1 is a surface view illustrating a configuration example of a light emitting element bonded board according to an embodiment. FIG. 2 is a cross-sectional view taken along line II-II in FIG. 1. FIG. 3 is a cross-sectional view taken along line III-III in FIG. 1. The light emitting element bonded board includes a laminated board 100, a ceramic capacitor 101, and a light emitting element 104. The ceramic capacitor 101 is surface-mounted on the laminated board 100. A ball grid array (BGA) 102 is provided on the surface of the laminated board 100.

As illustrated in FIG. 3, an optical waveguide 305 includes an optical waveguide core 108 and an optical waveguide cladding 208, and is formed within the laminated board 100. The laminated board 100 has a hollowed portion 103 that is hollowed out of the laminated board 100. The hollowed portion 103 is a through hole of the laminated board 100. The light emitting element 104 is, for example, a vertical cavity surface emitting laser (VCSEL), which includes a bonding portion (terminal) 105 and a light emitting portion 106, and is provided in the hollowed portion 103. In the light emitting element 104, the light emitting portion 106 emits light in response to a control signal input to the bonding portion 105.

Vias 107 are conductive portions, and are formed in the upper layer and/or the lower layer of the optical waveguide 305. On an end face of the laminated board 100 in the hollowed portion 103, the vias 107 and the optical waveguide cores 108 are exposed. The optical axis of the light emitting portion 106 of the light emitting element 104 coincides with the center line of the optical waveguide core 108 of the optical waveguide 305. The bonding portions 105 of the light emitting element 104 are bonded to the vias 107 via solder 216 in FIG. 2. An optical axis alignment between the light emitting portion 106 and the optical waveguide core 108 may be performed with a high precision, thereby reducing the loss of light. The plurality of optical waveguide cores 108 receive light from the plurality of light emitting portions 106 of the light emitting element 104, respectively, and transmit the light.

The laminated board 100 includes a plurality of optical waveguide cores 108, a plurality of first vias 107 formed in the upper layer of the plurality of optical waveguide cores 108, and a plurality of second vias 107 formed in the lower layer of the plurality of optical waveguide cores 108. As illustrated in FIG. 3, the interval A4 between the plurality of first vias 107 in the upper layer and the interval A4 between the plurality of second vias 107 in the lower layer are wider than the interval A3 between the plurality of optical waveguide cores 108. For example, the interval A4 between the vias 107 is 0.50 mm, and the interval A3 between the optical waveguide cores 108 is 0.25 mm. The number of vias 107 equals to the number of the optical waveguide cores 108.

Here, the same number of vias 107 as the optical waveguide cores 108 may be formed only in the upper layer or the lower layer of the optical waveguide cores 108. In such a case, the interval between the vias 107 may be set to 0.25 mm like the interval A3 between the optical waveguide cores 108. However, it is difficult to form laser via holes (LVH) used for forming the vias 107 at a 0.25-mm interval. Therefore, as illustrated in FIG. 3, the vias 107 are distributed to the upper layer and the lower layer of the optical waveguide cores 108, and the interval A4 between the vias 107 in the upper layer and the lower layer is set to twice the interval A3 between the optical waveguide cores 108. Here, the interval A4 between the vias 107 in the upper layer and the lower layer may be an integer multiple of the interval A3 between the optical waveguide cores 108. Since the interval A4 between the vias 107 becomes wide, the formation of the laser via holes (LVH) is facilitated so that the bonding portions 105 of the light emitting element 104 may be bonded to the vias 107. The present disclosure is not limited to the method of forming the vias 107 by forming the laser via holes and filling copper in the laser via holes through plating. The vias 107 may be formed by filling a conductive material in the via holes through other methods.

As illustrated in FIG. 3, the width A1 of the light emitting element 104 is about 3 mm, and the height A2 is about 0.3 mm. The diameter A6 of each of the circular patterns in the wiring layers L5 to L8 coupled to the vias 107 is 0.35 mm, and the interval A5 between the circular patterns is 0.15 mm. The diameter A8 of the top portion of the via 107 is 0.15 mm, and the height A7 is about 0.17 mm. Meanwhile, the numerical values exemplified herein are exemplary.

As illustrated in FIG. 2, the laminated board 100 includes a through hole 217 and non-through via holes (IVH: interstitial via holes) 218 and 219. As illustrated in FIG. 3, the laminated board 100 includes a through hole 301 and IVHs 303 and 304. A surface mount technology (SMT)) component 302 is, for example, a light emitting element driver that controls the light emitting element 104, and is mounted on the surface of the laminated board 100. The SMT component 302 outputs a control signal to the plurality of bonding portions 105 of the light emitting element 104 through the IVH 303 and the plurality of vias 107, and controls the light emission of the plurality of light emitting portions 106 of the light emitting element 104. It is easy to shorten the wiring distance between the SMT component 302 and the light emitting element 104.

The laminated board 100 includes a first board 221, a second board 222, and a third board 223. Herein, 12 layers are illustrated as an example. The first board 221 has a laminated structure including a protective layer 201, a conductive layer L1, an insulating layer 202, a conductive layer L2, an insulating layer 203, a conductive layer L3, an insulating layer 204, a conductive layer L4, an insulating layer 205, a conductive layer L5, an insulating layer 206, and a conductive layer L6. The second board 222 has a laminated structure including an insulating layer 207, the optical waveguide 305, and an insulating layer 209. The third board 223 has a laminated structure including a conductive layer L7, an insulating layer 210, a conductive layer L8, an insulating layer 211, a conductive layer L9, an insulating layer 212, a conductive layer L10, an insulating layer 213, a conductive layer L11, an insulating layer 214, a conductive layer L12, and a protective layer 215.

The plurality of vias 107 are formed between the conductive layers L5 and L6. The plurality of vias 107 are also formed between the conductive layers L7 and L8. In the optical waveguide 305, the plurality of optical waveguide cores 108 are covered with the optical waveguide cladding 208. For example, the protective layers 201 and 215 are resists, the conductive layers L1 to L12 and the vias 107 are made of copper, and the insulating layers 202 to 207 and 209 to 214 are prepregs (reinforced plastic molding materials).

First, the first board 221, the second board 222, and the third board 223 are manufactured, respectively. Then, the first board 221 and the third board 223 are bonded to each other with the second board 222 interposed therebetween. Here, the insulating layer 206 of the first board 221 and the insulating layer 210 of the third board 223 are solidified prepregs for a core. In contrast, the insulating layers 207 and 209 of the second board 222 are flexible prepregs for bonding. When a low-flow or non-flow bonding prepreg having a small protrusion amount is used, the positional accuracy in the Z direction may be improved, and a thickness variation may be reduced. Here, the three boards 221 to 223 may not be bonded, while the optical waveguide 305 may be used as a core of the laminated board 100 so that the laminated board 100 may be manufactured as a build-up board.

The positional accuracy in the X direction between the optical waveguide cores 108 and the vias 107 may be highly precisely aligned with ±tens of μm through a pin lamination method. As the insulating layers 207 and 209 of the second board 222, prepregs for bonding with a small thickness variation may be used so as to improve the positional accuracy in the Z direction between the optical waveguide cores 108 and the vias 107. In the hollowed portion 103, the end faces of the optical waveguide cores 108 may be mirror-finished by polishing or the like so that the loss of light may be reduced on the end faces of the optical waveguide cores 108. It is unnecessary to form a solder resist for protection on the end face of the laminated board 100 in the hollowed portion 103.

It is required to make the protrusion smaller on the end face of the hollowed portion 103 so that the light emitting element 104 is not tilted when the light emitting element 104 is bonded to the vias 107. Thus, when the hollowed portion 103 is formed in the laminated board 100 by a drill (router), the processing speed of the drill may be adjusted so as to suppress burrs on the end face of the hollowed portion 103.

When the end face of the hollowed portion 103 becomes a curved surface, all the plurality of vias 107 may not bonded to the plurality of bonding portions 105 of the light emitting element 104 via the solder 216. Thus, it is required to form the hollowed portion 103 by a drill such that the end face of the hollowed portion 103 becomes a horizontal plane.

When the distance between the optical waveguide core 108 and the solder 216 is short, foreign matters may adhere to the surface of the optical waveguide core 108 due to flux-scattering or gas release of the solder 216. Thus, the bonding portions 105 of the light emitting element 104 may be bonded to the vias 107 through the solder 216 that does not contain flux or does not release a gas, gold bump pressure welding or the like. Accordingly, the surface of the optical waveguide core 108 may become clean. The bonding portions 105 of the light emitting element 104 may be bonded to the vias 107 through a conductive adhesive (an epoxy-based silver paste) instead of the solder 216.

Since the insulating layers 206, 207, 209, and 210 at the bonding portion are large in the thermal expansion in the Z direction, a strong stress is applied to the solder 216. Thus, as the insulating layers 206, 207, 209, and 210 at the bonding portion, a material having a low thermal expansion coefficient may be used.

Figure 4:
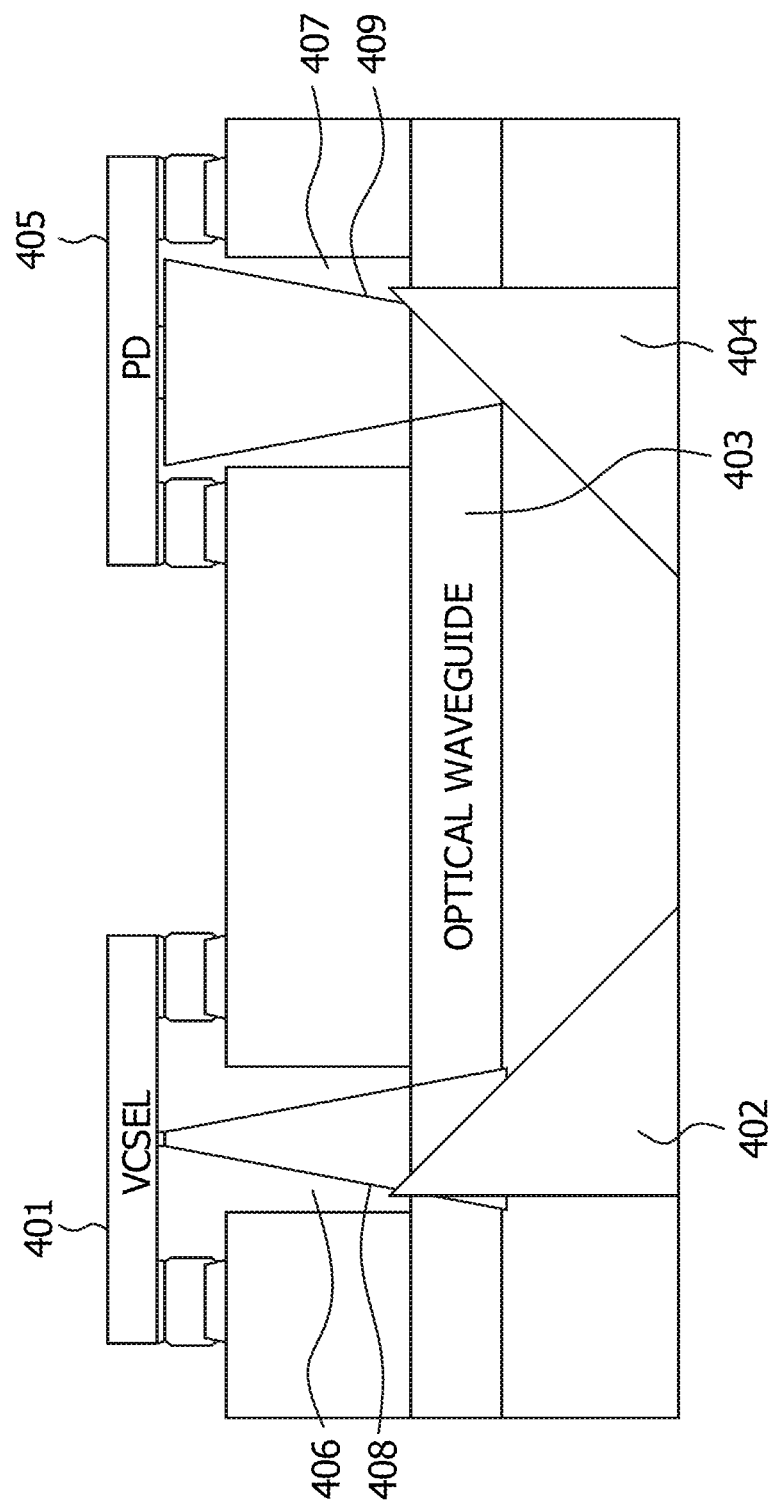
FIG. 4 is a cross-sectional view illustrating a configuration example of a VCSEL board according to a first comparative example.

FIG. 4 is a cross-sectional view illustrating a configuration example of a VCSEL board according to a first comparative example. The VCSEL board includes a VCSEL 401, mirrors 402 and 404, an optical waveguide 403, and a photodiode 405. Hereinafter, the problems of the VCSEL board will be described. Since the distance from the VCSEL 401 to the mirror 402 is long, light 408 emitted by the VCSEL 401 is diffused. The positional accuracy of a via 406 between the VCSEL 401 and the mirror 402 is required to be high. Slopes with 45° precision are hardly formed on the mirrors 402 and 404. The mirrors 402 and 404 are hardly mirror-finish, and a loss occurs in the reflection of the mirrors 402 and 404. Since the board is scraped to form the mirrors 402 and 404, a wiring may not be provided in the corresponding portion of the board. Since the distance from the mirror 404 to the photodiode 405 is long, light 409 reflected by the mirror 404 is diffused. A high precision is required for the positional accuracy of a via 407 between the photodiode 405 and the mirror 404.

The light emitting element bonded board according to the embodiment in FIGS. 1 to 3 does not use a mirror, and thus the above described problems caused by the mirrors 402 and 404 may be solved. In the light emitting element bonded board according to the embodiment in FIGS. 1 to 3, since the distance from the light emitting element 104 to the optical waveguide core 108 is short, the diffusion of light may be reduced.

Figure 5:
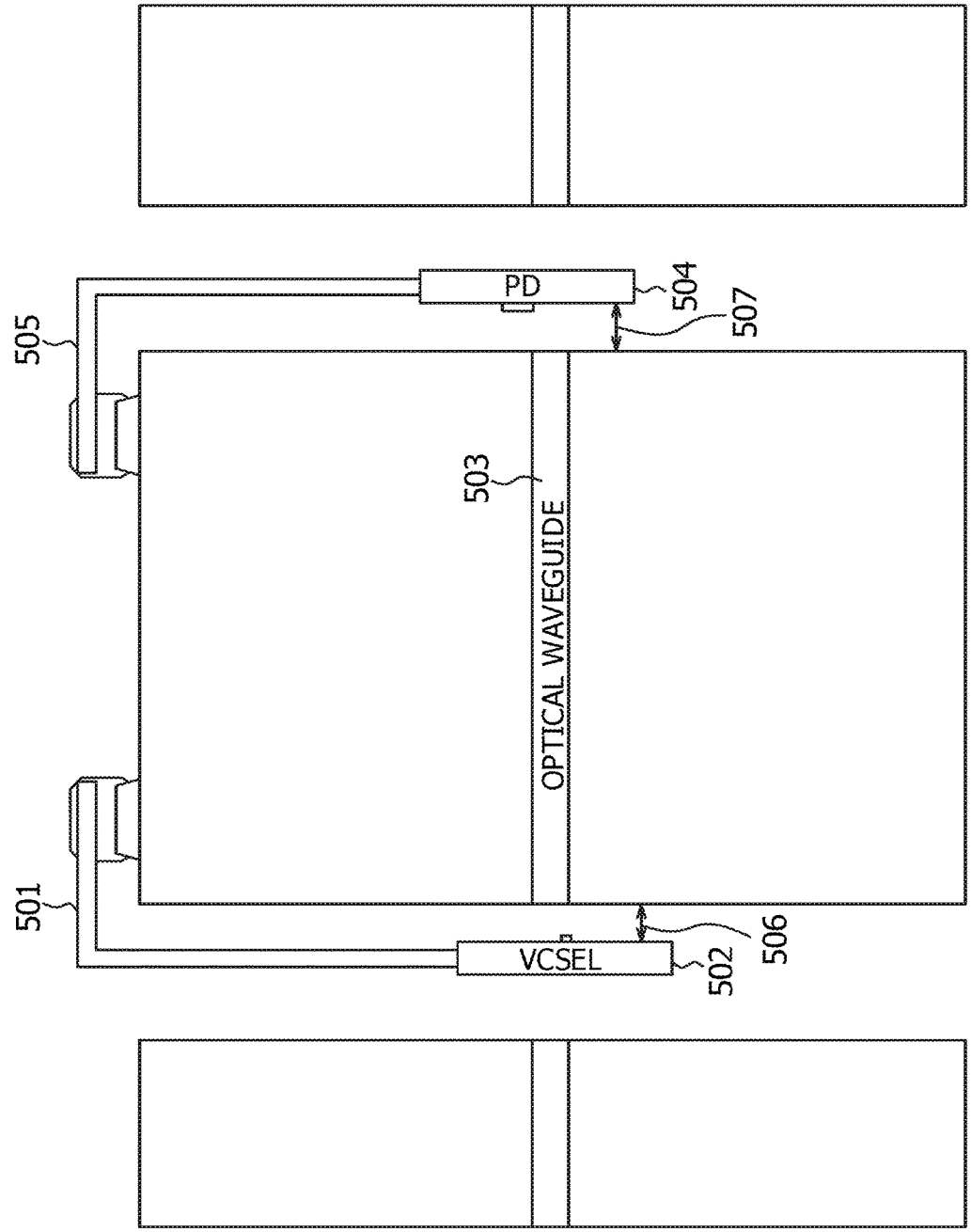
FIG. 5 is a cross-sectional view illustrating a configuration example of a VCSEL board according to a second comparative example.

FIG. 5 is a cross-sectional view illustrating a configuration example of a VCSEL board according to a second comparative example. The VCSEL board includes an L lead 501, a VCSEL 502, an optical waveguide 503, a photodiode 504, and an L lead 505. Hereinafter, the problems of the VCSEL board will be described. Since the L leads 501 and 505 are long, the L leads 501 and 505 are hardly attached to the board. The L leads 501 and 505 are hardly formed with a shape of a 45° precision, and a linear precision that supports the VCSEL 502 and the photodiode 504 is hardly implemented. Since the L leads 501 and 505 are used, an optical axis alignment is hardly performed between the VCSEL 502 and the optical waveguide 503, and between the photodiode 504 and the optical waveguide 503. A deviation may easily occur in a distance 506 between the VCSEL 502 and the optical waveguide 503. A deviation may easily occur in a distance 507 between the photodiode 504 and the optical waveguide 503.

In the light emitting element bonded board according to the embodiment in FIGS. 1 to 3, since the bonding portion 105 of the light emitting element 104 is bonded to the via 107 without using an L lead, the above described problems caused by the L leads 501 and 505 may be solved.

Figure 6:
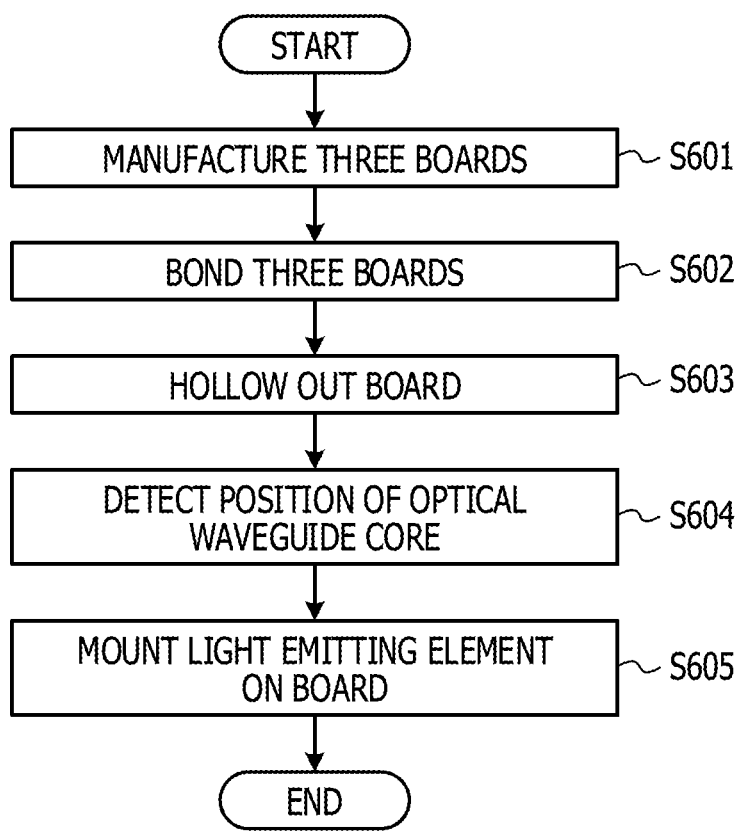
FIG. 6 is a flow chart illustrating a method of manufacturing the light emitting element bonded board according to the embodiment.

FIG. 6 is a flow chart illustrating a method of manufacturing a light emitting element bonded board according to the embodiment. First, in step S601, as illustrated in FIGS. 1 to 3, the first board 221, the second board 222, and the third board 223 are manufactured. Here, the vias 107 are formed within cylindrical via holes of the first board 221 and/or the third board 223, and the optical waveguide 305 is formed within the second board 222.

Next, in step S602, the first board 221 and the third board 223 are bonded to each other while the second board 222 within which the optical waveguide 305 is formed is interposed between the first board 221 and the third board 223, thereby forming the laminated board 100.

Next, in step S603, the hollowed portion 103 is formed in the laminated board 100 in which the first board 221, the second board 222, and the third board 223 are bonded so that the vias 107 of the first board 221 and/or the third board 223 and the optical waveguide 305 (the optical waveguide cores 108) of the second board 222 are exposed. Details of step S603 will be described below with reference to FIGS. 7A and 7B to FIG. 10.

Next, in step S604, the position of the optical waveguide core 108 of the second board 222 is detected by a camera 1101 (FIGS. 11A and 11B), and the detected position of the optical waveguide core 108 is recorded. Details of step S604 will be described below with reference to FIGS. 11A and 11B.

Next, in step S605, the vias 107 of the first board 221 and/or the third board 223 are bonded to the bonding portions 105 of the light emitting element 104 such that the center line of each of the optical waveguide cores 108 of the second board 222 coincides with the optical axis of each of the light emitting portions 106 of the light emitting element 104. Accordingly, the light emitting element 104 is mounted in the laminated board 100. Details of step S605 will be described below with reference to FIGS. 12A and 12B, and FIGS. 13A and 13B.

Figure 7A:
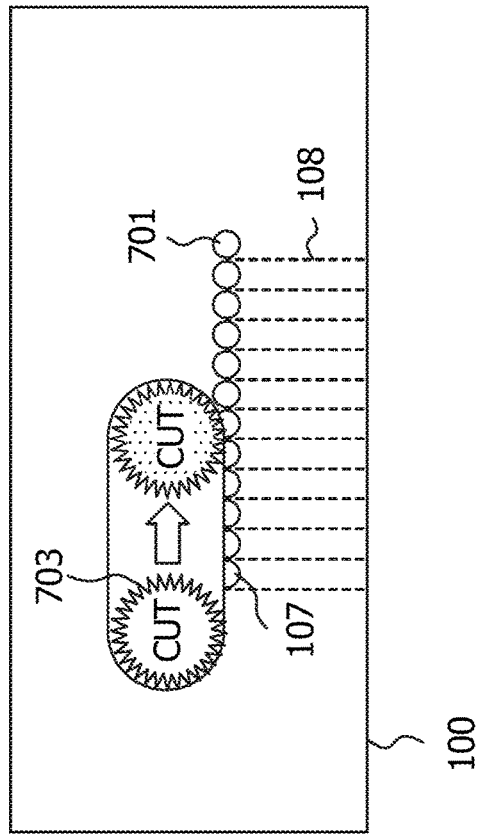
FIGS. 7A and 7B are views illustrating the step S603 in FIG. 6.
Figure 7B:
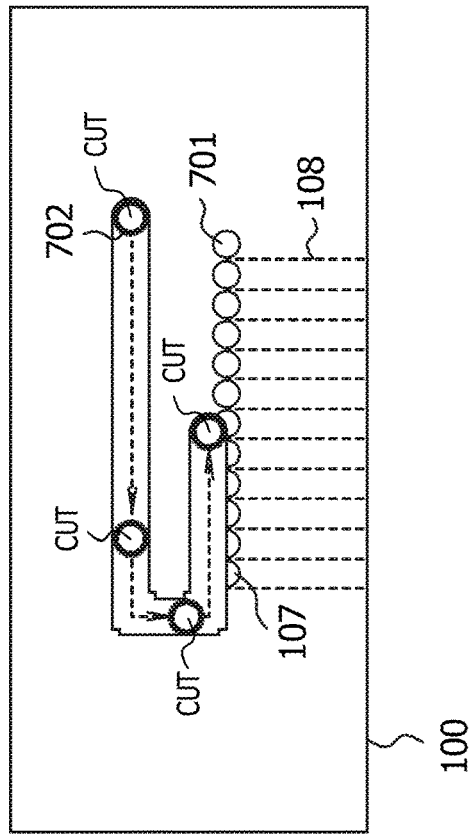

FIGS. 7A and 7B are views illustrating step S603 in FIG. 6. As illustrated in FIG. 7A, in step S603, the hollowed portion 103 is formed by moving a small drill (a router) 702 one round along the outline of the hollowed portion 103 of the laminated board 100. As illustrated in FIG. 7B, the hollowed portion 103 is formed by moving a large drill 703 in one direction with respect to the laminated board 100. As described above, the hollowed portion 103 is formed by hollowing out a part of the laminated board 100. At the end face of the hollowed portion 103, a cylindrical via 701 is ground by the drill 702 or 703 and then the via 107 in a semi-cylindrical shape is formed. At the end face of the hollowed portion 103, the via 107 and the optical waveguide core 108 are exposed. The positional accuracy of the hollowed portion 103 may be improved by adjusting the rotational speed of the drill 702 or 703, or forming a position recognition mark.

Figure 8B:
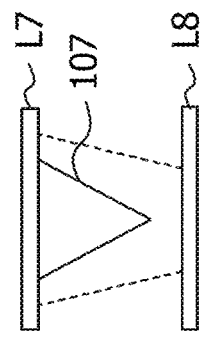
FIGS. 8A to 8C are views for explaining a positional deviation of a hollowed portion.
Figure 8C:
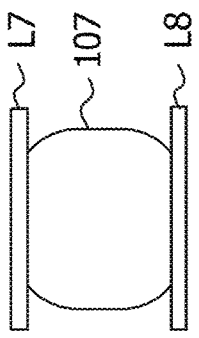
Figure 8A:
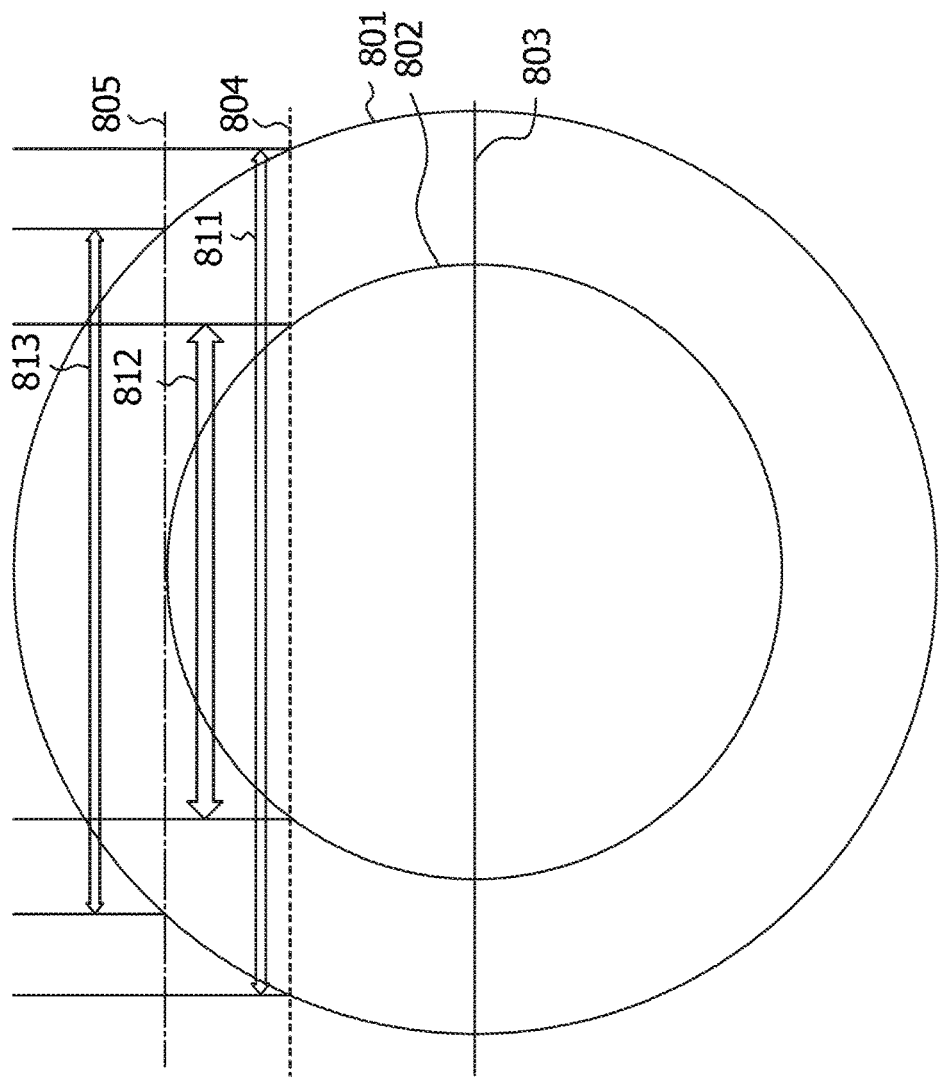

FIG. 8A is a view for explaining a positional deviation of the hollowed portion 103. A diameter 801 is a diameter of the top portion of the via 107 before the hollowed portion 103 is formed, and is, for example, 0.15 mm. A diameter 802 is a diameter of the bottom portion of the via 107 before the hollowed portion 103 is formed, and is, for example, 0.10 mm.

First, descriptions will be made on the case where there is no positional deviation in the hollowed portion 103. When the hollowed portion 103 with an end face 803 is formed, as illustrated in FIG. 3, the length of the top portion of the via 107 becomes the same as the diameter 801 (0.15 mm), and the length of the bottom portion becomes the same as the diameter 802 (0.10 mm). In this case, the area of the via 107 exposed at the end face 803 is maximized, which is desirable.

Then, descriptions will be made on the case where the positional deviation in the hollowed portion 103 is small. An end face 804 is shifted in the position from the end face 803 by 30 μm. When the hollowed portion 103 with the end face 804 is formed, the length 811 of the top portion of the via 107 is about 138 μm, which is shorter than the diameter 801 (0.15 mm). The length 812 of the bottom portion of the via 107 is about 80 μm, which is shorter than the diameter 802 (0.10 mm). In this case, the area of the via 107 exposed at the end face 804 is narrowed, which is not desirable.

Next, descriptions will be made on the case where the positional deviation in the hollowed portion 103 is large. An end face 805 is shifted in the position from the end face 803 by 50 μm. When the hollowed portion 103 with the end face 805 is formed, the length 813 of the top portion of the via 107 is about 112 μm, which is shorter than the diameter 801 (0.15 mm). The length of the bottom portion of the via 107 is 0 μm. In this case, as illustrated in FIG. 8B, the bottom portion of the via 107 exposed at the end face 804 is separated from the conductive layer L8, and the area of the via 107 is narrowed, which is not desirable. This is because the diameter 802 of the bottom portion of the via 107 is shorter than the diameter 801 of the top portion of the via 107.

Therefore, as illustrated in FIG. 8C, a drum-shaped laser via hole may be formed and then the via 107 in the drum shape may be formed between the wiring layers L7 and L8. In this case, even when the position of the hollowed portion 103 is shifted, the reduction of the cross-sectional area of the via 107 may be suppressed.

FIG. 9A illustrates a vertical cross-sectional view and a horizontal cross-sectional view when the via 107 is formed within a true-circular via hole formed by a laser, and the hollowed portion 103 is formed at an end face 903 with no positional deviation. In the via 107 between the conductive layers L7 and L8, the length of a top portion 901 is maximized, and the length of a bottom portion 902 is maximized. In this case, the cross-sectional area of the via 107 is maximized.

FIG. 9B illustrates a vertical cross-sectional view and a horizontal cross-sectional view when the via 107 is formed within an elliptical via hole formed by a laser, and the hollowed portion 103 is formed at the end face 903 with no positional deviation. In the via 107 between the conductive layers L7 and L8, the length of the top portion 901 is maximized, and the length of the bottom portion 902 is maximized. In this case, the cross-sectional area of the via 107 is maximized.

FIG. 9C corresponds to FIG. 9A and illustrates a vertical cross-sectional view and a horizontal cross-sectional view when the via 107 is formed within a true-circular via hole formed by a laser, and the hollowed portion 103 is formed at an end face 904 with a positional deviation. In the via 107 between the conductive layers L7 and L8, the length 911 of a top portion is shortened, and the length of a bottom portion becomes 0. In this case, the cross-sectional area of the via 107 is narrowed. That is, in the case of the via 107 in the true-circular shape, the cross-sectional area of the via 107 is large on the end face 903 with no positional deviation as illustrated in FIG. 9A, while the cross-sectional area of the via 107 becomes small on the end face 904 with a positional deviation as illustrated in FIG. 9C.

FIG. 9D corresponds to FIG. 9B and illustrates a vertical cross-sectional view and a horizontal cross-sectional view when the via 107 is formed within an elliptical via hole formed by a laser, and the hollowed portion 103 is formed at the end face 904 with a positional deviation. In the via 107 between the conductive layers L7 and L8, the length of the top portion 901 is maximized, and the length of the bottom portion 902 is maximized. In this case, the cross-sectional area of the via 107 is maximized. First, an elliptical via hole is formed by a laser, and then the inside of the elliptical via hole is plated with copper to form the via 107. In the case of the via 107 in the elliptical shape, the cross-sectional area of the via 107 is large without a change on the end face 903 with no positional deviation as illustrated in FIG. 9B as well as on the end face 904 with a positional deviation as illustrated in FIG. 9D. When the cross-sectional area of the via 107 is large, the bonding between the via 107 and the bonding portion 105 of the light emitting element 104 becomes good.

Figure 10:
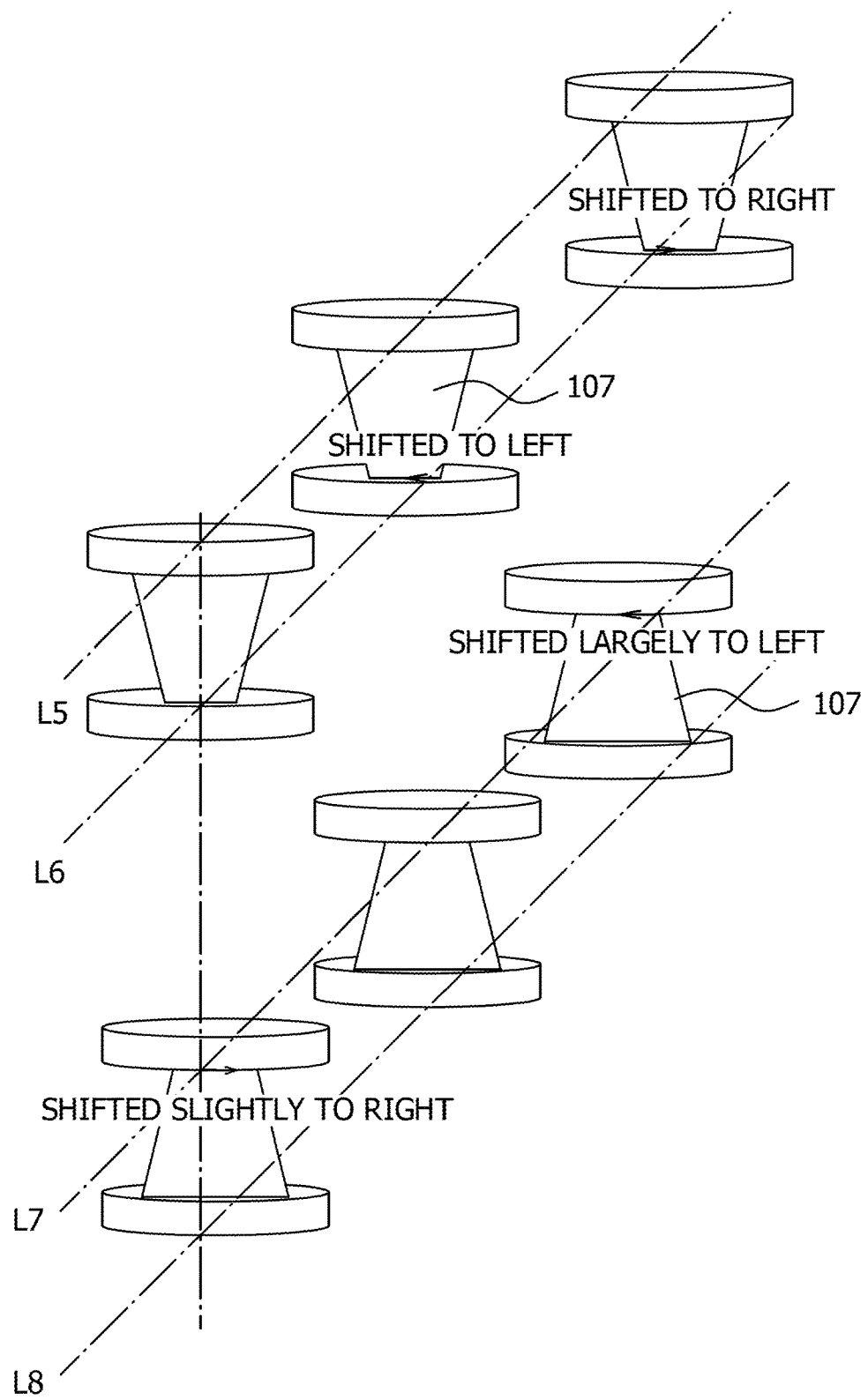
FIG. 10 is a view for explaining a method of determining a position of the end face of the hollowed portion.

FIG. 10 is a view for explaining a method of determining a position of the end face of the hollowed portion 103. The plurality of vias 107 are formed between the conductive layers L5 and L6, and the plurality of vias 107 are formed between the conductive layers L7 and L8. The plurality of vias 107 may include a via 107 with no positional deviation, a via 107 shifted to the left, and a via 107 shifted to the right. It is necessary to determine the position of the end face of the hollowed portion 103 such that cross-sectional areas of all the vias 107 are as large as possible on the end face of the hollowed portion 103. First, the positions of the plurality of vias 107 in the inner layer of the laminated board 100 are measured through X rays. Then, the optimum position of the end face of the hollowed portion 103 is determined through a least squares method based on the positions of the plurality of vias 107. The optimum position of the end face of the hollowed portion 103 may be determined based on the median value or the average value instead of the least squares method.

After the hollowed portion 103 of the laminated board 100 is formed, the end face of the optical waveguide core 108 in the hollowed portion 103 is mirror-finished so as to reduce the incidence loss of the optical waveguide core 108. The flatness of the end face of the hollowed portion 103 needs to be at the same level as that of the flatness of the surface of the laminated board 100. After the hollowed portion 103 is formed, burrs may occur on the end face of the hollowed portion 103. The burrs on the end face of the hollowed portion 103 may come in contact with the light emitting element 104, and thus needs to be removed. For this reason, it is highly required to remove the protrusion of the hollowed portion 103, rather than the recessed portion of the hollowed portion 103. Only the end face of the optical waveguide core 108 may be mirror-finished, or the entire end face of the hollowed portion 103 may be mirror-finished.

In the mirror-finishing, any one of the following three methods may be used. In the first method, the end face of the hollowed portion 103 is mirror-finished by drilling with, for example, a drill bit attached with abrasive paper for polishing. In the second method, the end face of the hollowed portion 103 is mirror-finished by being rubbed with a brush attached with abrasive paper for polishing in up/down/left/right directions. In the third method, since the inside of the hollowed portion 103 is narrow, the end face of the hollowed portion 103 is irradiated with a laser in an oblique direction, and is mirror-finished by laser-finishing.

Figure 11B:
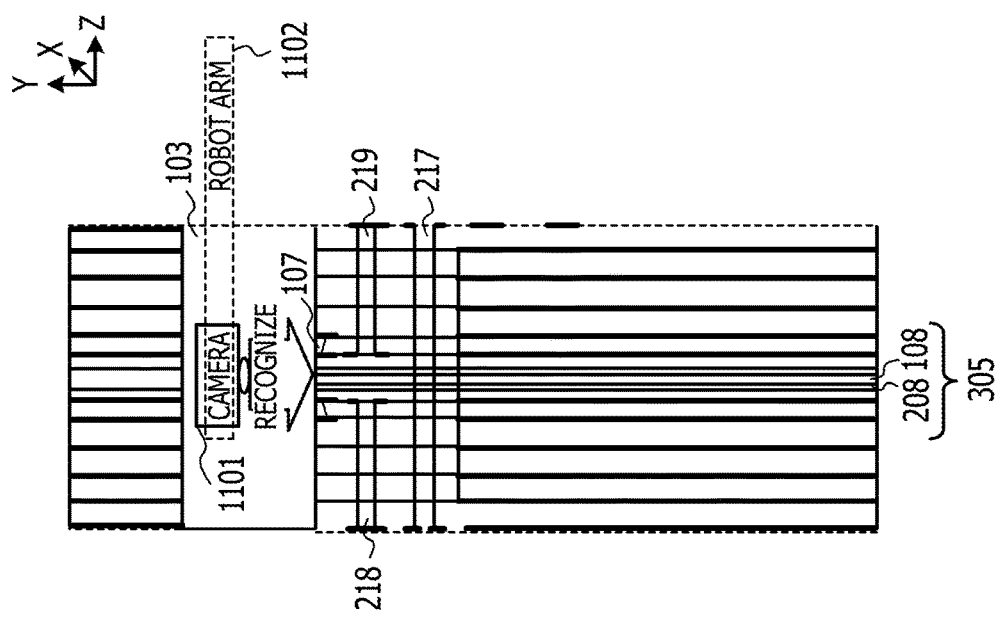
FIGS. 11A and 11B are a surface view and a cross-sectional view illustrating a laminated board, which are explaining a process in step S604 in FIG. 6.
Figure 11A:
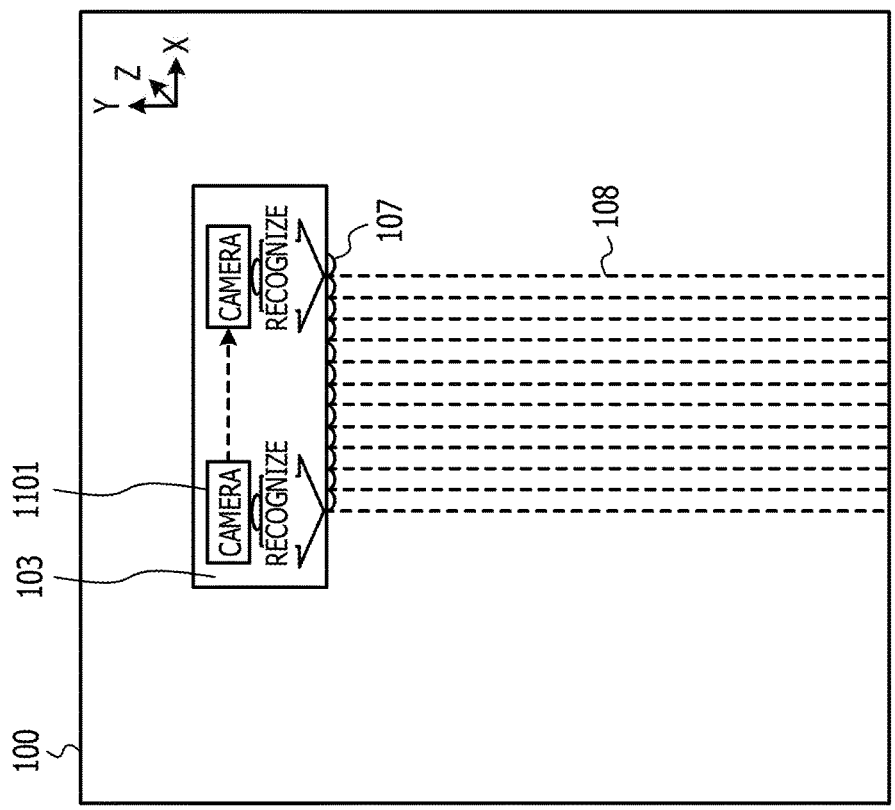

FIG. 11A is a surface view illustrating the laminated board 100 for explaining the process in step S604 in FIG. 6, and FIG. 11B is a cross-sectional view illustrating the laminated board 100 of FIG. 11A. First, the laminated board 100 in an erected state is held by a jig. Then, the camera 1101 held by a robot arm 1102 is inserted in the hollowed portion 103, and is moved. The camera 1101 images the plurality of optical waveguide cores 108 one by one, on the end face of the hollowed portion 103. A computer recognizes images of the plurality of optical waveguide cores 108 imaged by the camera 1101, detects the positions of the plurality of optical waveguide cores 108, and records the positions of the plurality of optical waveguide cores 108.

FIG. 12A is a surface view illustrating the laminated board 100 for explaining the process in step S605 in FIG. 6, and FIG. 12B is a cross-sectional view illustrating the laminated board 100 of FIG. 12A. First, solder 216 is transferred to the plurality of bonding portions 105 of the light emitting element 104. The solder 216 may be applied to the plurality of vias 107 by a "<" shaped nozzle, or instead of the solder 216, a non-conductive film (NCF) may be placed on the plurality of vias 107. Then, the light emitting element 104 held by a robot arm (a mechanical chuck) 1201 is inserted in the hollowed portion 103, and is moved to the detected positions of the plurality of optical waveguide cores 108. Then, the light emitting element 104 is landed on the end face of the hollowed portion 103 such that the optical axes of the plurality of optical waveguide cores 108 and the plurality of light emitting portions 106 of the light emitting element 104 coincide with each other, and the positions of the plurality of vias 107 and the plurality of bonding portions 105 of the light emitting element 104 coincide with each other.

Figure 13A:
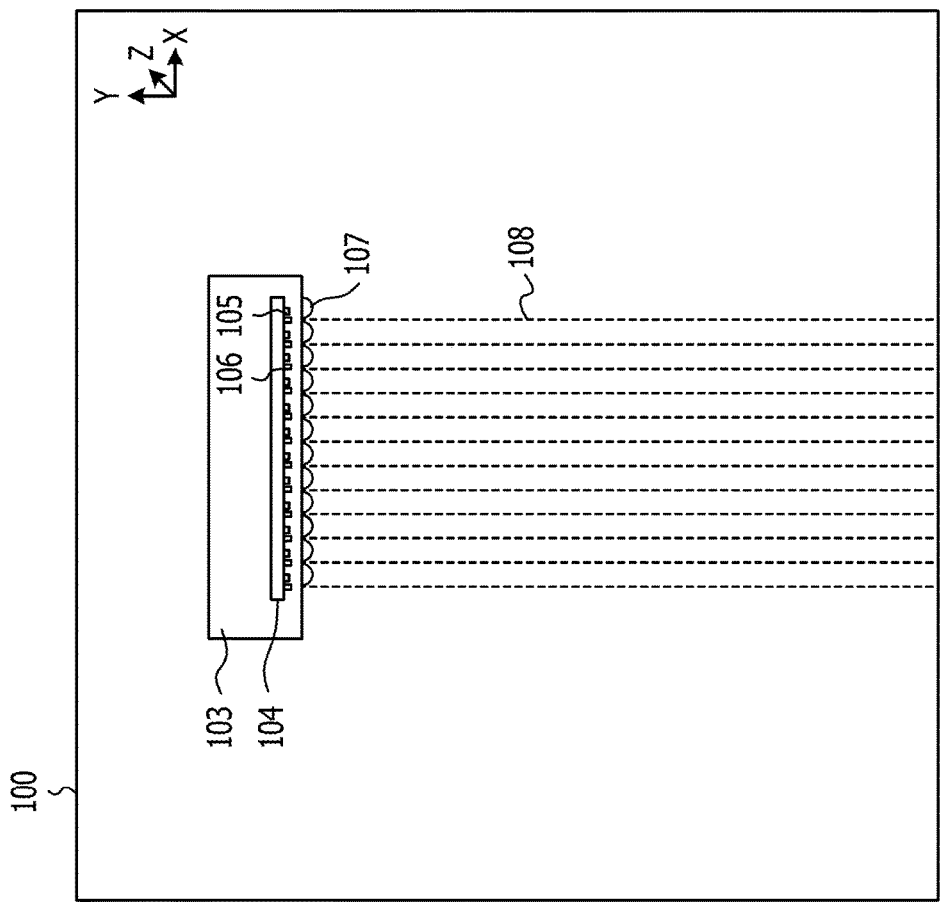
FIGS. 13A and 13B are a surface view and a cross-sectional view illustrating the laminated board, which are explaining a process after the process in FIGS. 12A and 12B.
Figure 13B:
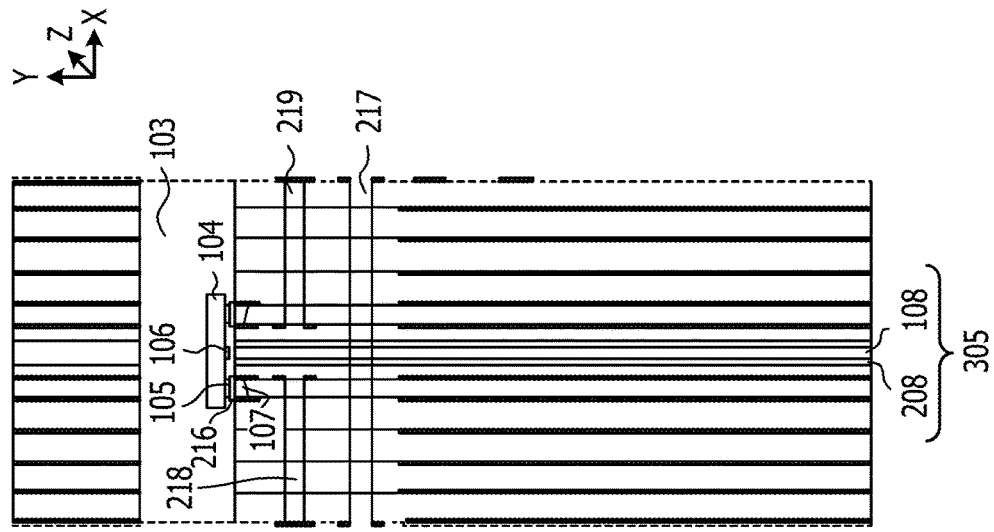

FIG. 13A is a surface view illustrating the laminated board 100 for explaining a process after the process in FIGS. 12A and 12B, and FIG. 13B is a cross-sectional view illustrating the laminated board 100 of FIG. 13A. The light emitting element 104 is heated while being held by the robot arm 1201 in FIG. 12B so as not to be deviated by surface tension. The plurality of bonding portions 105 of the light emitting element 104 are bonded to the plurality of vias 107 via the solder 216, respectively. In the heating method, the light emitting element 104 may be heated through the robot arm 1201, or locally heated while the bonding portions are irradiated with a light beam, infrared rays, or the like. When a gold bump is used instead of the solder 216, ultrasonic waves may be transferred via the robot arm 1201, and the bonding portions 105 may be bonded to the vias 107 via the gold bump through pressure welding.

FIG. 14A is a surface view illustrating a configuration example of a light emitting element bonded board according to another embodiment, and FIG. 14B is a cross-sectional view illustrating the light emitting element bonded board of FIG. 14A. Hereinafter, descriptions will be made on the difference between FIGS. 14A and 14B and FIGS. 1 to 3. The light emitting element bonded board includes a laminated board 100, a light emitting element 104, and a relay board (interposer) 1402. The hollowed portion 103 has a first end face 1404 and a second end face 1405. The second end face 1405 faces the first end face 1404. As in FIGS. 1 to 3, the optical waveguide cores 108 are provided on the first end face 1404. The vias 107 are formed not on the first end face 1404, but on the second end face 1405. The relay board 1402 includes a plurality of wirings 1403. The plurality of bonding portions 105 of the light emitting element 104 are connected to the plurality of wirings 1403 of the relay board 1402 via a plurality of wires 1401, respectively. The plurality of vias 107 of the second end face 1405 are bonded to the plurality of wirings 1403 of the relay board 1402, respectively, via solder 1406. Accordingly, the plurality of bonding portions 105 of the light emitting element 104 are electrically connected to the plurality of vias 107 of the second end face 1405, respectively. The center line of each of the plurality of the optical waveguide cores 108 on the first end face 1404 coincides with the optical axis of each of the plurality of the light emitting portions 106 of the light emitting element 104.

On the second end face 1405, the plurality of vias 107 are bonded to the plurality of wirings 1403 of the relay board 1402, respectively, via the solder 1406. Therefore, foreign matters coming out of the solder 1406 hardly reaches the optical waveguide cores 108 of the first end face 1404. Accordingly, foreign matters may be suppressed from adhering to the optical waveguide cores 108, and then, the optical waveguide cores 108 may be cleaned, and a light loss may be reduced. In order to prevent the light trajectory of the light emitting element 104 from being tilted, it is desirable that the distance between the light emitting element 104 and the first end face 1404 is short.

FIG. 15A is a surface view illustrating a configuration example of a light emitting element bonded board according to another embodiment, and FIG. 15B is a cross-sectional view illustrating the light emitting element bonded board of FIG. 15A. Hereinafter, descriptions will be made on the difference between FIGS. 15A and 15B and FIGS. 1 to 3. The light emitting element bonded board includes the laminated board 100, the light emitting element 104, and a relay board (interposer) 1501. The hollowed portion 103 has a first end face 1504 and third end faces 1505 and 1506. The third end faces 1505 and 1506 are faces having steps with respect to both outsides of the first end face 1504. The first end face 1504 is a deeply scraped face, and the third end faces 1505 and 1506 are shallowly scraped faces. As in FIGS. 1 to 3, the optical waveguide cores 108 are provided on the first end face 1504. The vias 107 are formed not on the first end face 1504, but on the third end faces 1505 and 1506. The relay board 1501 includes a plurality of wirings 1502. The plurality of bonding portions 105 of the light emitting element 104 are connected to the plurality of wirings 1502 of the relay board 1501 via a plurality of wires 1401, respectively. The plurality of vias 107 of the third end faces 1505 and 1506 are bonded to the plurality of wirings 1502 of the relay board 1501, respectively, via solder 1503. Accordingly, the plurality of bonding portions 105 of the light emitting element 104 are electrically connected to the plurality of vias 107 of the third end faces 1505 and 1506, respectively. The center line of each of the plurality of the optical waveguide cores 108 on the first end face 1504 coincides with the optical axis of each of the plurality of the light emitting portions 106 of the light emitting element 104. Since the third end faces 1505 and 1506 have steps with respect to the first end face 1504, the light emitting portion 106 of the light emitting element 104 and the wires 1401 may be suppressed from coming in contact with the first end face 1504.

In FIGS. 15A and 15B, the plurality of vias 107 are formed in the region where the plurality of vias 107 do not overlap the plurality of optical waveguide cores 108 in the horizontal direction in the section of the laminated board 100. In contrast, in FIGS. 1 to 3, the plurality of vias 107 are formed in the region where the plurality of vias 107 overlap the plurality of optical waveguide cores 108 in the horizontal direction in the section of the laminated board 100.

Figure 16:
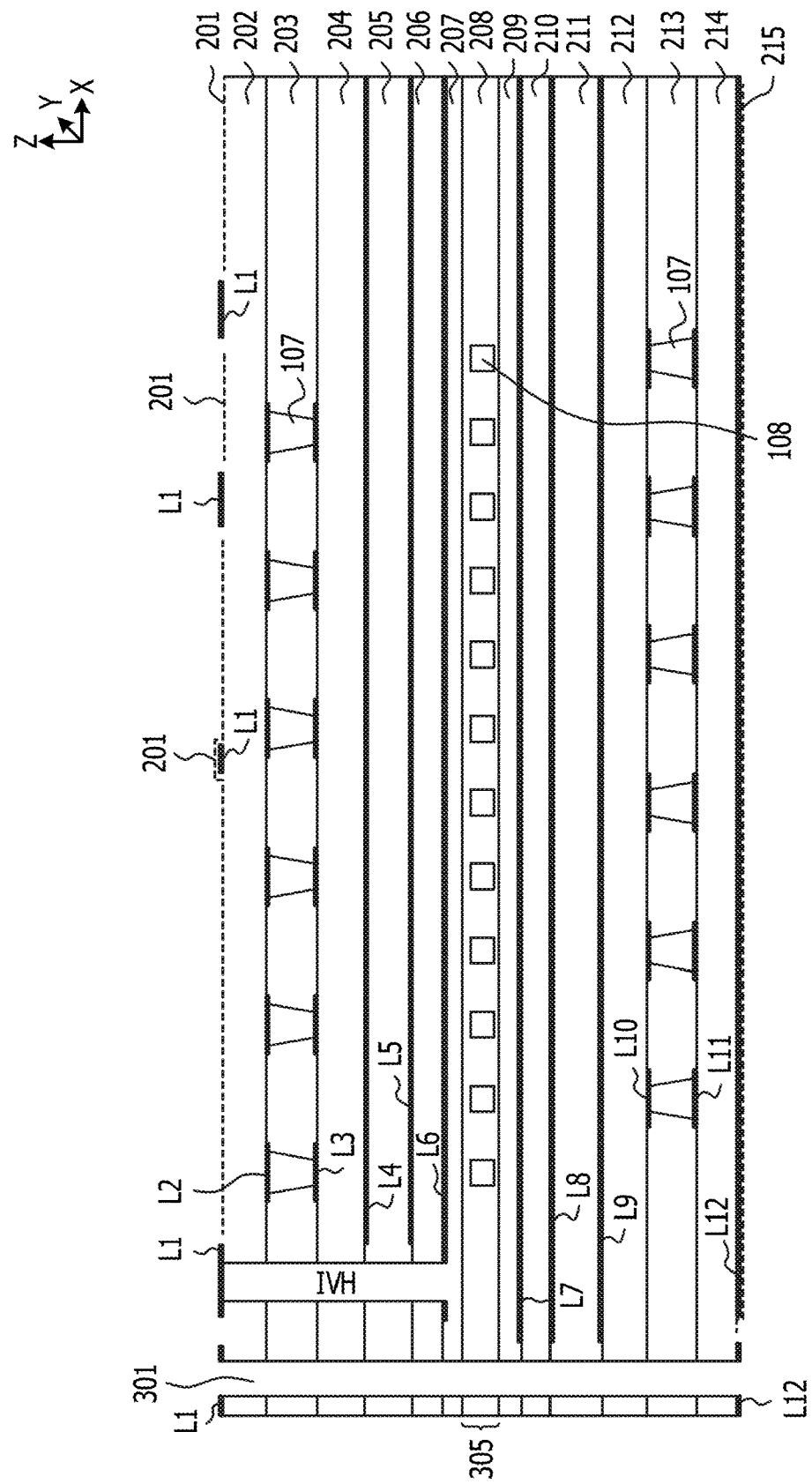
FIG. 16 is a cross-sectional view illustrating a configuration example of a light emitting element bonded board according to another embodiment.

FIG. 16 is a cross-sectional view illustrating a configuration example of a light emitting element bonded board according to another embodiment. Hereinafter, descriptions will be made on the difference between FIG. 16 and FIGS. 1 to 3. The positions of the plurality of vias 107 are determined so as to match the positions of the plurality of bonding portions 105 of the light emitting element 104. When the distance between the light emitting portion 106 and the bonding portion 105 in the light emitting element 104 in the Z direction is long, the distance between the optical waveguide core 108 and the via 107 in the Z direction needs to be long correspondingly. In such a case, the plurality of vias 107 are formed between the conductive layers L2 and L3, and the plurality of vias 107 are formed between the conductive layers L10 and L11. In order to align the positions of the vias 107 in the Z direction, a press pressure, a residual copper rate, a layer configuration or the like may be adjusted in the insulating layers 203 to 207 and 209 to 213, and the laminated board 100.

Figure 17:
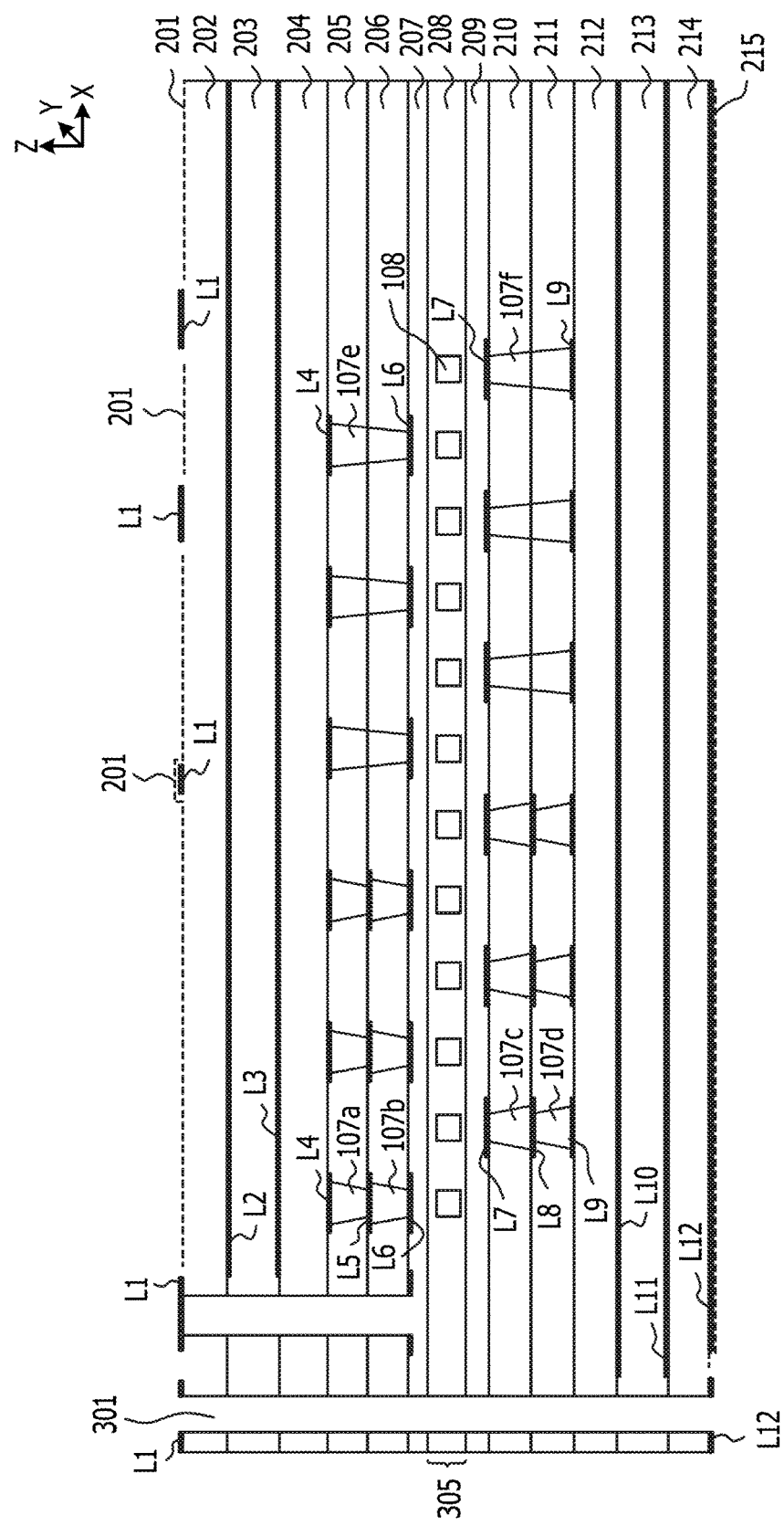
FIG. 17 is a cross-sectional view illustrating a configuration example of a light emitting element bonded board according to another embodiment.

FIG. 17 is a cross-sectional view illustrating a configuration example of a light emitting element bonded board according to another embodiment. Hereinafter, descriptions will be made on the difference between FIG. 17 and FIGS. 1 to 3. As described above, the plurality of vias 107 are bonded to the plurality of bonding portions 105 of the light emitting element 104, respectively, via the solder 216. When the strength of the bonding is insufficient, it is required to increase the cross-sectional area of the via 107 in order to increase the bonding area. For example, the cross-sectional area of the via 107 may be increased by forming a laser via hole with a diameter longer than 0.15 mm, and then forming the via 107 with a long diameter.

The vias 107*a* and 107*b* in the upper layer are stacked vias. The vias 107*a* are formed between the conductive layers L4 and L5. The vias 107*b* are formed between the conductive layers L5 and L6. The stacked vias 107*a* and 107*b* in the upper layer correspond to the vias 107, and are bonded to the bonding portions 105 of the light emitting element 104 via the solder 216. The stacked vias 107*a* and 107*b* have a cross-sectional area about twice the via 107.

Similarly, the vias 107*c* and 107*d* in the lower layer are stacked vias. The vias 107*c* are formed between the conductive layers L7 and L8. The vias 107*d* are formed between the conductive layers L8 and L9. The stacked vias 107*c* and 107*d* in the lower layer correspond to the vias 107, and are bonded to the bonding portions 105 of the light emitting element 104 via the solder 216. The stacked vias 107*c* and 107*d* have a cross-sectional area about twice the via 107.

The vias 107*e* in the upper layer are skip vias. The skip vias 107*e* are formed between the conductive layers L4 and L6 while skipping the conductive layer L5. The skip vias 107*e* correspond to the vias 107, and are bonded to the bonding portions 105 of the light emitting element 104 via the solder 216. Each of the skip vias 107*e* has a cross-sectional area about twice the via 107.

Similarly, the vias 107*f* in the lower layer are skip vias. The skip vias 107*f* are formed between the conductive layers L7 and L9 while skipping the conductive layer L8. The skip vias 107*f* correspond to the vias 107, and are bonded to the bonding portions 105 of the light emitting element 104 via the solder 216. Each of the skip vias 107*f* has a cross-sectional area about twice the via 107.

FIGS. 18A to 18C are cross-sectional views illustrating three types of configuration examples of the light emitting element bonded board. FIG. 18A corresponds to FIG. 2, and the hollowed portion 103 is a through hole of the laminated board 100. The plurality of bonding portions 105 of the light emitting element 104 are bonded to the plurality of vias 107, respectively, via the solder 216. The optical axis of each of the plurality of light emitting portions 106 of the light emitting element 104 coincides with the optical axis of each of the plurality of optical waveguide cores 108. The laminated board 100 is advantageous in that the distance between the via 107 in the upper layer and the via 107 in the lower layer may be increased. When the width of the light emitting element 104 is smaller than the thickness of the laminated board 100, there is an advantage in that the light emitting element 104 does not protrude from the laminated board 100. Heat may be applied from both sides of the conductive layers L1 and Ln.

In FIG. 18B, the hollowed portion 103 is a bottomed hole of the laminated board 100. The vias 107 in both two-layers (two-stages) are formed in the layer above the optical waveguide cores 108. Similarly, in the light emitting element 104, the bonding portions 105 in both two-stages are provided at the right side of the light emitting portions 106. The plurality of bonding portions 105 of the light emitting element 104 are bonded to the plurality of vias 107, respectively, via the solder 216. The optical axis of each of the plurality of light emitting portions 106 of the light emitting element 104 coincides with the optical axis of each of the plurality of optical waveguide cores 108. Since the hollowed portion 103 is not a through hole, a wiring may be formed in the region of the laminated board 100 at the conductive layer Ln side. The surface of the laminated board 100 at the conductive layer Ln may be brought into contact with a housing or the like.

In FIG. 18C, the hollowed portion 103 is a bottomed hole of the laminated board 100. Instead of the plurality of vias 107 in two layers as illustrated in FIG. 18B, the plurality of conductive portions L3 and L4 in two layers as illustrated in FIG. 18C are provided. The plurality of conductive portions L3 and L4 are patterns of thick copper wiring layers. The conductive portions L3 and L4 in both two layers (two stages) are formed in the layer above the optical waveguide cores 108. Similarly, in the light emitting element 104, the bonding portions 105 in both two stages are provided at the right side of the light emitting portions 106. The plurality of bonding portions 105 of the light emitting element 104 are bonded to the plurality of conductive portions L3 and L4, respectively, via the solder 216. The optical axis of each of the plurality of light emitting portions 106 of the light emitting element 104 coincides with the optical axis of each of the plurality of optical waveguide cores 108. Since the conductive portions L3 and L4 are not vias but patterns of conductive layers, there is an advantage in that the cross-sectional areas of the conductive portions L3 and L4 are not changed even if the end face of the hollowed portion 103 is deviated.

FIGS. 19A and 19B are a surface view and a cross-sectional view illustrating a configuration example of a light emitting element bonded board according to another embodiment. In the light emitting element bonded board in FIGS. 1 to 3, the light emitting element 104 is provided in the hollowed portion 103 of the laminated board 100. In contrast, in the light emitting element bonded board in FIGS. 19A and 19B, the light emitting element 104 is provided on the end portion of the laminated board 100. Hereinafter, descriptions will be made on the difference between the light emitting element bonded board in FIGS. 19A and 19B and the light emitting element bonded board in FIGS. 1 to 3.

The optical waveguide 305 includes the optical waveguide core 108 and the optical waveguide cladding 208, and is formed within the laminated board 100. The light emitting element 104 includes the bonding portion 105 and the light emitting portion 106, and is provided on the end portion of the laminated board 100. In the light emitting element 104, the light emitting portion 106 emits light in response to a control signal input to the bonding portion 105.

The vias 107 are conductive portions, and are formed in the upper layer and/or the lower layer of the optical waveguide 305 as in FIG. 3. On the end portion of the laminated board 100, the vias 107 and the optical waveguide cores 108 are exposed. The optical axis of the light emitting portion 106 of the light emitting element 104 coincides with the center line of the optical waveguide core 108 of the optical waveguide 305. The bonding portions 105 of the light emitting element 104 are bonded to the vias 107 via the solder 216. The plurality of optical waveguide cores 108 receive light from the plurality of light emitting portions 106 of the light emitting element 104, respectively, and transmit the light. An optical axis alignment may be performed between the light emitting portion 106 and the optical waveguide core 108 with a high precision, thereby reducing the loss of light.

According to the plurality of embodiments as described above, the light emitting element 104 may be bonded to the laminated board 100 in which the optical waveguide core 108 is formed with a high precision.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A light emitting element bonded board comprising:
   an optical waveguide cladding layer that includes a plurality of optical waveguide cores;
   a first insulating layer formed above the optical waveguide cladding layer;
   a second insulating layer formed below the optical waveguide cladding layer;
   a hollowed portion formed in the first insulating layer, the optical waveguide cladding layer and the second insulating layer;
   a light emitting element installed in the hollowed portion;
   a plurality of first bonding portions on a surface of the light emitting element;
   a plurality of second bonding portions on the surface of the light emitting element;
   a plurality of light emitting portions formed between the plurality of first bonding portions and the plurality of second bonding portions and formed on the surface of the light emitting element;
   a plurality of first conductive portions exposed on an end face of the first insulating layer in the hollowed portion; and
   a plurality of second conductive portions exposed on an end face of the second insulating layer in the hollowed portion,
   end faces of the plurality of optical waveguide cores being exposed on an end face of the optical waveguide cladding layer in the hollowed portion,
   an optical axis of each of the light emitting portions coincides with a center line of the optical waveguide cores,
   the plurality of bonding portions of the light emitting element are bonded to the plurality of first conductive portions, and
   the plurality of second bonding portions of the light emitting element are bonded to the plurality of second conductive portions.

2. The light emitting element bonded board according to claim 1, wherein the plurality of first conductive portions and the plurality of second conductive portions are vias.

3. The light emitting element bonded board according to claim 1, wherein the hollowed portion is a through hole or a bottomed hole.

4. The light emitting element bonded board according to claim 2, wherein the vias are skip vias or stacked vias.

5. A light emitting element bonded board comprising:
   an optical waveguide cladding layer that includes a plurality of optical waveguide cores;
   a first insulating layer formed above the optical waveguide cladding layer;
   a second insulating layer formed below the optical waveguide cladding layer;
   a light emitting element arranged on an end portion of the light emitting element bonded board;
   a plurality of first bonding portions on a surface of the light emitting element;
   a plurality of second bonding portions on the surface of the light emitting element;
   a plurality of light emitting portions formed between the plurality of first bonding portions and the plurality of second bonding portions and formed on the surface of the light emitting element;
   a plurality of first conductive portions exposed on an end face of the first insulating layer on the end portion of the light emitting element bonded board; and
   a plurality of second conductive portions exposed on an end face of the second insulating layer on the end portion of the light emitting element bonded board,
   end faces of the plurality of optical waveguide cores being exposed on an end face of the optical waveguide cladding layer on the end portion of the light emitting element bonded board, an optical axis of each of the light emitting portions coincides with a center line of the optical waveguide cores,
the plurality of bonding portions of the light emitting element are bonded to the plurality of first conductive portions, and
the plurality of second bonding portions of the light emitting element are bonded to the plurality of second conductive portions.

* * * * *